United States Patent [19]
Rubin et al.

[11] Patent Number: 5,825,361
[45] Date of Patent: Oct. 20, 1998

[54] DYNAMIC GRAPHICAL SYSTEM CONFIGURATION UTILITY

[75] Inventors: Stephen E. Rubin, Needham; Paul J. Vanslette, Blackstone; Scott Favreau, Milford, all of Mass.

[73] Assignee: Intellution, Inc., Norwood, Mass.

[21] Appl. No.: 623,742

[22] Filed: Mar. 29, 1996

Related U.S. Application Data

[63] Continuation of Ser. No. 454,870, May 31, 1995, abandoned, which is a continuation of Ser. No. 968,061, Oct. 28, 1992, abandoned.

[51] Int. Cl.$^6$ .................................. G06F 3/14; G06F 15/00
[52] U.S. Cl. ......................... 345/349; 345/966; 345/965; 345/967; 364/188; 364/192
[58] Field of Search ........................... 395/159, 161, 395/155, 156, 157, 140, 153, 349, 348, 354, 965–967, 340, 352, 347, 975, 969–970, 333–334; 364/188, 190, 191, 192

[56] References Cited

U.S. PATENT DOCUMENTS

| | | | |
|---|---|---|---|
| 4,656,603 | 4/1987 | Dunn | 395/348 |
| 4,899,136 | 2/1990 | Beard et al. | 395/349 X |
| 4,899,276 | 2/1990 | Stadler | 345/113 |
| 4,901,221 | 2/1990 | Kodosky et al. | 395/348 |
| 4,974,173 | 11/1990 | Stefik et al. | 395/349 X |
| 5,040,131 | 8/1991 | Torres | 395/352 |
| 5,163,130 | 11/1992 | Hullot | 395/334 |
| 5,179,653 | 1/1993 | Fuller | 395/354 |
| 5,182,796 | 1/1993 | Shibayama et al. | 395/354 X |
| 5,202,828 | 4/1993 | Vertelney et al. | 395/333 X |
| 5,208,907 | 5/1993 | Shelton et al. | 395/975 X |
| 5,228,123 | 7/1993 | Heckel | 395/334 |
| 5,261,042 | 11/1993 | Brandt | 395/348 X |
| 5,261,044 | 11/1993 | Dev et al. | 395/348 X |
| 5,276,795 | 1/1994 | Hoeber et al. | 395/354 X |
| 5,276,801 | 1/1994 | Heyen et al. | 395/501 |
| 5,394,522 | 2/1995 | Sanchez-Frank et al. | 395/349 |
| 5,408,603 | 4/1995 | Van de Lavoir et al. | 395/349 |
| 5,471,399 | 11/1995 | Tanaka et al. | 395/349 X |
| 5,500,934 | 3/1996 | Austin et al. | 395/348 X |

OTHER PUBLICATIONS

Moser, Karen D., "Borland Updates Turbo C++ Compiler for DOS", PC Week, Mar. 9, 1992, p. 85(1).
"Using Microsoft Word", Microsoft Corp., 1989, pp. 302–305.
"DeskSet Environment Reference Guide", Sun Microsystems, 1990, pp. 74–81, 100–105.
Advanced Interface Design Guide, IBM, Jun. 1989, pp. 46–49, 62–87.

*Primary Examiner*—Raymond J. Bayerl
*Attorney, Agent, or Firm*—Wolf, Greenfield & Sacks, P.C.

[57] ABSTRACT

A graphics-oriented technique for enabling a user to configure data processing features of a computer system that includes at least one computer. The data processing features are presented to the user in the form of displayed graphical objects, each of which represents one feature. The user selects a graphical object using an input device of the computer (e.g., a mouse), and is then prompted to enter information associated with the data processing feature represented by the selected object. The computer system is then enabled to use the data processing feature to process data in accordance with the user-specified information. After the configuration information has been entered for at least some of the objects, symbols are added to the display to indicate that the data processing features that the objects represent have been enabled, which presents to the user a comprehensive, easily understood representation of the current configuration state of the system.

23 Claims, 24 Drawing Sheets

125 SCU DATA STRUCTURE

| | |
|---|---|
| 201 | SCU DRIVER INFORMATION (Fig. 2b) |
| 202 | SCU NODE INFORMATION |
| 203 | SCU PATH INFORMATION (Fig. 2c) |
| 204 | SCU ALARM INFORMATION (Fig. 2d) |
| 205 | SCU NETWORK INFORMATION (Fig. 2e) |
| 206 | SCU TASK INFORMATION |
| 207 | SCU SQL INFORMATION |
| 208 | NODE NAME |
| 209 | FILENAME OF SCU DATAFILE |
| 210 | STARTUP INFORMATION (Fig. 2f) |
| 211 | MISCELLANEOUS OTHER INFORMATION |
| 212 | ACTIVE REGION LIST (Fig. 2g) |

Fig. 2a

201 SCU DRIVER INFORMATION

| | |
|---|---|
| 269 | NUMBER OF CONFIGURED DRIVERS |
| | 270a \| 270b \| 270c \| ... \| 270n |

270 INDIVIDUAL DRIVER INFORMATION

| | |
|---|---|
| 221 | DRIVER TYPE |
| 222 | PLATFORM TYPE |

Fig. 2b

202 SCU PATH INFORMATION

| | |
|---|---|
| 241 | BASEPATH |
| 242 | LOCAL PATH |
| 243 | DATABASE PATH |
| 244 | NLS AND HELP PATH |
| 245 | PICTURE PATH |
| 246 | APPLICATION PATH |
| 247 | HISTORICAL DATA PATH |
| 248 | HISTORICAL PATH |
| 249 | ALARM PATH |

Fig. 2c

| 201 SCU STARTUP INFORMATION | |
|---|---|
| 235 | NODE DESCRIPTOR |
| 236 | SCADA OPTION ENABLED? |
| 237 | DATABASE INFORMATION |
| 238 | NETWORK OPTION SUPPORTED? |
| 239 | NLS ENABLED? |

Fig. 2f

| 212 ACTIVE REGION LIST | | | | | |
|---|---|---|---|---|---|
| 254 | NUMBER OF ACTIVE REGIONS | | | | |
| | 2120a | 2120b | 2120c | ... | 2120k |

| 2120 INDIVIDUAL ACTIVE REGION | |
|---|---|
| 263 | IDENTITY |
| 264 | ENABLE/DISABLE? |
| 265 | RESOURCE ID |
| 266 | BOUNDING RECTANGLE |
| 267 | CALLBACK FUNCTION |
| 268 | DATA FOR CALLBACK FUNCTION |

Fig. 2g

DYNAMIC GRAPHICAL SYSTEM CONFIGURATION UTILITY

This application is a continuation of application Ser. No. 08/454,870 filed May 31, 1995, now abandoned, which, in turn, is a continuation of application Ser. No. 07/968,061, filed Oct. 28, 1992, also now abandoned.

BACKGROUND OF THE INVENTION

This invention relates to configuring data processing systems, and more particularly to configuring process control data processing systems used to monitor and control the operation of an industrial facility.

Process control systems are used in industrial facilities (such as factories and power plants) to sample and store large amounts of data corresponding to the processes they monitor and control. One example of such a system is described in U.S. Pat. No. 5,179,701, previously copending U.S. patent application Ser. No. 07/366,740, filed Jun. 15, 1990 (hereinafter, the "'740 application"), assigned to the present assignee and incorporated herein by reference. As described in the '740 application, the process control system includes a group of computers that are arranged as nodes to communicate over a network.

When a process control system is first installed or is modified (i.e., by adding new computers), the system must be configured to function properly. Configuring a process control system can be a complex, error prone task in which the user is required to keep track of numerous options, files, computer connections, and software configurations for all computers in the system.

Typically, a user configures such a system from a written description (e.g., in the system manual) that identifies the features that can be configured and specifies the procedure for configuring the features (and, sometimes, the order in which the features are to be configured). The user types in commands (using the keyboard of a system computer that he or she is configuring) based on instructions in the manual to configure such features as the data paths that the computer will use, alarm conditions, network specifications, etc. In general, the user is required to type in the applicable information for each feature. The user typically keeps track of the features that have been configured by, e.g., proceeding through a written checklist that he or she constructs or that the manual provides.

SUMMARY OF THE INVENTION

In general, this invention provides a graphics-driven technique for enabling a user to configure data processing features of a computer system in an efficient and straightforward way. The configurable data processing features are represented by displayed graphical objects (such as icons) that the user can readily comprehend and associate with each data processing feature. Symbols are created and added to the display for at least some of the configured features to present the user with a pictorial view of the features that have been configured, thereby enabling the user to readily determine which features have been configured without having to resort to written checklists and the like.

In one general aspect of the invention, the user selects a displayed graphical object using an input device of the computer and is prompted to enter information associated with the data processing feature represented by the object; the computer system is enabled to thereafter use the data processing feature to process data in accordance with the entered information.

Preferred embodiments include the following features.

A set of graphical objects (such as icons) are displayed. Each object in the set represents one data processing feature. The objects can be selected in any order, and each time an object is selected the user is prompted to enter information for the data processing feature associated that object. In this way, the user can configure a set of data processing features and enable the computer system to execute all features that have been configured.

After the configuration information has been entered for at least some of the objects, symbols are added to the display to indicate that the data processing features that the objects represent have been enabled. Preferably, the symbols are easily associated with their data processing feature. For example, a block diagram of a computer network is displayed when a networking feature has been configured, and an alarm bell is displayed to indicate that various alarm functions have been configured.

The user is prompted to enter configuration information by displaying a field that is associated with the data processing feature represented by the selected object. The field includes one or more record within which the user can enter the information to define the feature using the input device (which includes, e.g., a keyboard or mouse).

Multiple instances of some data processing features (e.g., alarm functions) are created by following the graphics-driven procedure discussed above. Separate symbols are displayed to indicate that multiple instances of the data processing feature have been established. These symbols are displayed in active regions of the display device to enable the user to designate the symbol using the input device, thereby providing a graphical short-cut to access and change parameters of the individual instances. When the user designates a symbol, a field is displayed containing the information that was previously entered for the processing instance represented by the symbol. The user can change the information in the field using the input device, and as a result can easily and quickly modify the data processing instance.

A wide variety of data processing features can be configured using the invention. One such feature establishes one or more data paths for storing data files; the user-defined information identifies storage locations for the files. Another feature enables the computer to communicate with at least one other computer over a network, and information entered by the user includes (among other data) identities of the other computers.

Still another data processing feature that is configurable with the invention includes processing alarms in response to data processed during operation (e.g, managing alarm procedures, managing alarm functions, and routing alarm signals to selected locations such as printers). The user defines this feature by entering information defining, e.g., the destinations of alarms generated during operation. Another configurable data processing feature is the ability of the computer to exchange data signals with an external device (e.g., an I/O driver used in a process control system), and the information entered by the user specifies (among other parameters) the operating conditions of the device. Data processing tasks are also configurable, and the information that the user is prompted to enter defines the task.

The invention greatly eases the often complex and time consuming task of configuring a computer system that may include a single standalone computer or many computers that communicate over a network. Presenting the configuration options to the user graphically, and displaying a graphical representation of the configuration state of the system dramatically improves the "user-friendliness" of the configuration procedure, because the user is able to visualize the "real-world" objects and features that are modified or otherwise affected by the configuration procedure.

Other features and advantages of the invention will become apparent from the following detailed description, and from the claims.

BRIEF DESCRIPTION OF THE DRAWING

We first briefly describe the drawings.

FIGS. 2a–2g show System Configuration Utility (SCU) data structures useful in understanding the structure and operation of the SCU.

DESCRIPTION OF THE PREFERRED EMBODIMENT(S)

Figure 1:
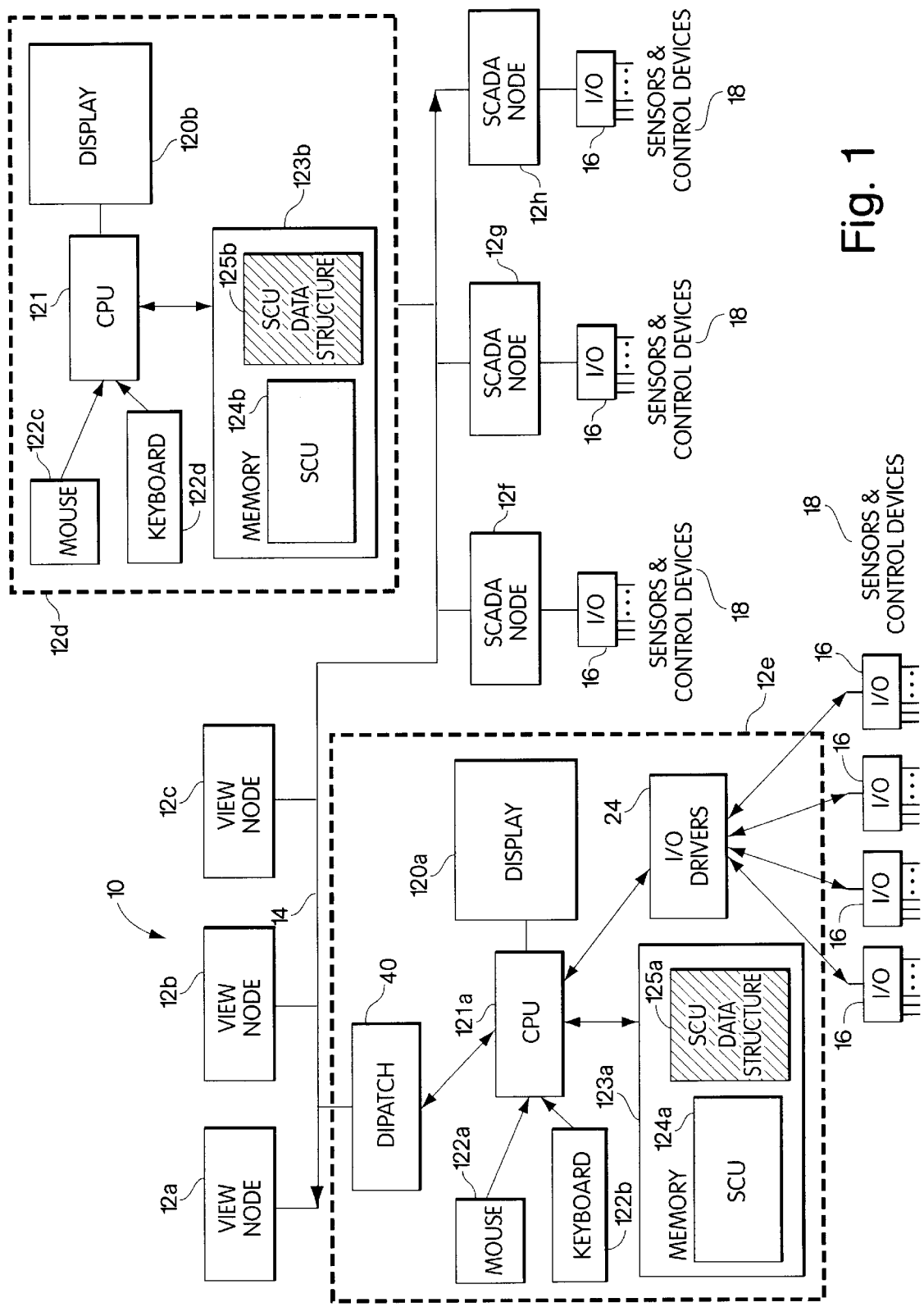
FIG. 1 is a block diagram of an automated process control system that uses a network of computer nodes.

Referring to FIG. 1, a process control system 10 for monitoring the operation of a facility, includes computers 12a–12h that are arranged as nodes to communicate over a network 14. Computers 12a–12h are, for example, IBM PS/2 computers. Some nodes, e.g., computers 12a–12d (called view nodes), are used to access data that has been gathered from machines in the factory and stored at the remaining nodes, e.g., computers 12e–12h (called supervisory control and data acquisition, or SCADA, nodes). System 10 is similar to that described in the '740 application.

Each SCADA node 12e–12h acquires data from or applies data to a plurality of (such as four) I/O devices 16, providing interfaces with various commercially available sensors and control devices that are arranged at various locations throughout the factory. The sensors detect and measure many different kinds of operating parameters, such as temperature, pressure, flow rate, and fluid level, while the control devices perform various tasks, such as operating valves, actuating relays, and operating fluid pumps.

Data associated with the sensors and control devices associated with each SCADA node (e.g., node 12e) are stored in a process database in memory 123a of SCADA node 12e. Data is transferred to and from a process database via one I/O device 16 and I/O drivers 24.

The computer of each SCADA node 12e–12h and view node 12a–12d has a CPU 121 connected to a memory 123, and may be connected to a display 120 and a plurality of input devices 122, for example, a mouse (122a, 122c) and a keyboard (122b, 122d). The computer of each SCADA node 12e–12h also has a dispatch 40 which connects CPU 121a to network 14.

Configuration of an automated control system 10, such as the one shown in FIG. 1, is a complex, difficult, and error-prone task. Numerous aspects of control system 10, including specification for each node 12a–12f, drivers 16, and network 14 may have to be configured according the requirements of each specific plant. This invention provides a System Configuration Utility 124 (hereinafter referred to as SCU) which gives users the ability to configure system 10 from any node 12a–12f by providing a dynamically changing graphical representation of the state of system 10 on that node's display 120.

When system 10 is to be configured, SCU program 124 is loaded into memory 123 of any node 12a–12f on network 14. As SCU program 124 progresses through its operations (described in further detail below) it creates or modifies an SCU data structure 125 in memory 123 that defines the configuration of system 10.

Referring to FIG. 2a, SCU data structure 125 contains information (201–211) needed to described the current system configuration of system 10, as well as certain control information. (The details of SCU data structure 125 are described in detail below.) Before discussion the structure and operation of the SCU, a brief overview of typical system configuration and operation will be given.

SYSTEM OVERVIEW

The context of this invention is an industrial automation system 10 which provides real time data to plant personnel and other software applications throughout an enterprise on displays 120 of nodes 12a–12h (FIG. 1). This real time data presentation is the key to more efficient use of resources in personnel and ultimately to more automation. We will first describe the functions that the system performs to make data presentation possible. Software executes the basic functions that allow specific applications of the system to perform their assigned tasks. The two most basic functions are data acquisition and data management.

Data Acquisition

Data acquisition is the ability to retrieve data from the plant floor and to process that data in usable form. System 10 can also write data to plant floor thereby establishing the critical two-way link that controls an application. System 10 communicates directly with the input/output (I/O) devices 16 and communicates through a software interface called an I/O driver 24 (FIG. 1). System 10 has an extensive catalog of I/O drivers 24 that support specialty I/O devices as well as conventional I/O devices 16. In most cases, the system can work with the I/O hardware already installed in the plant. Even if the plant has I/O devices 16 from different manufacturers in the same network, I/O drivers 24 can access and work with all of them.

Data Management

Once system 10 acquires data, it manipulates and channels the data according the requests of software applications in memory 123 of nodes 12a–12f. This process is known as data management. System 10 runs on industry standard computer hardware. Plants can take advantage of existing computer hardware by investing in the appropriate system platform. Different parts of a plant can use different computer hardware. Since all of the platforms (nodes 12a–12f) of system 10 come with the intrinsic ability to communicate with nodes 12a–12f running on other platforms, plant managers can tie the entire plant together in network 14.

The basic functions of data acquisition and management provide the basis for all the industrial automation tasks that the system can perform. For the most part, users do not interact with the programs that execute these tasks. Collectively these tasks are known as basic node support.

SCADA Functions

The first step in automation is to use plant floor operators and technicians more efficiently. System 10 replaces the traditional control room with SCADA nodes 12e–12h comprising graphical screen 120. Nodes 12e–12h replace many of the functions of the controller, including monitoring, supervisory control, alarming and control.

Monitoring

Monitoring is the ability to display real-time plant floor data to operators. System 10 provides powerful numeric testing, text and graphical formats that make data more accessible.

Supervisory Control

Supervisory control is the ability to monitor real time data coupled with the ability of operators to change set points and other key values directly from nodes 12a–12h. Since system 10 can both read and write plant floor data, users can establish a supervisory control station (e.g., one or more of view nodes 12a–12d). Users choose which data points are read and write and which are read only.

Alarming

Where the operators are working from a monitoring station node (e.g., 12d) or a supervisory control station node (e.g., 12e), they need the ability to immediately recognize exceptional events within the process. Alarming is the ability to recognize exceptional events and immediately report those events. System 10 generates alarms based on the control limits that the users set. The systems" applications can use the alarms in a variety of ways to notify operators. Users can also selectively configure communication of alarm messages between nodes 12a–12h on network 14.

Control

Control is the ability to automatically apply procedures that adjust process values and thereby maintain those values within set limits. Control goes one step beyond supervisory control by removing the need for human interaction. Users use nodes 12 to control the whole or part of the process. System 10 includes continuous control, batch control, and statistical process control.

Reporting Functions

Many plants require the ability to report or store real time data for later analysis. System 10 has the ability to create reports and files of critical systems and process information.

Data Archiving

Any data point in system 10 can be sampled and stored in data files at user specified rates. The data can be retrieved at any time from the data files to create trend displays of historical data. Managers and engineers can use the data to examine the events leading up to critical events after addressing more immediate problems.

Reporting

System 10 supplies functions that allow users to access data through industry standard data exchange protocols. Users can create detailed reports with spreadsheets that contain acquired and calculated real-time data and historical data.

Open Architecture Functions

Many plants have needs that can be solved by having access to real-time data. System 10 provides a set of programming language functions in the C programming language that provide read and write access to any data point in system 10. The architecture of system 10 provides plant engineers with tools to write software applications that resolve such automation needs. The architecture also allows engineers to write applications that provide key real-time data to operations management software and other data platforms.

Processing Capabilities

Processing capabilities of system 10 allow for a wide variety of configurations and processing strategies.

Distributed Processing

The architecture of system 10 allows plants to distribute critical functions among all nodes 12a–12h on network 14. Each node 12a–12h can communicate with all other nodes 12a–12h on network 14.

Time Based Processing

Most applications work by acquiring and calculating data every so many seconds, minutes or hours. System 10 can perform any combination of time base processing. A user can balance system resources between data that needs to be acquired quickly and data that can be acquired over long intervals. System 10 can perform subsecond processing down to 0.05 seconds.

Exception Based Processing

Processing that is triggered by events rather than by time is known as exception based processing. Processing can be triggered by daily changes, unsolicited messages from the process hardware, operator actions and software applications. Exception based processing is essential for true distributed SCADA applications that monitor a large number of I/O devices. For example, an oil field may be monitoring pipelines through a large network of remote terminal units. The data from the remote terminal units changes infrequently, so there is no need to acquire data at a fixed interval. However, when the data does change, oil field operators need to know about it immediately. System 10 senses the changed value and processes it immediately. Nodes 12a–12h of system 10 can perform both time and exception based processing simultaneously.

System Architecture

Nodes

A node is any node 12a–12h running software of system 10. An actual node 12 can be anyone of the following nodes:

A basic node: meaning any computer that has system 10 installed on it.

Local and remote nodes: when working within a distributed system, local refers to node 12 that the user is working on. Remote refers to any node 12 that the user needs network 14 in order to access.

Standalone: refers to a node 12 that performs all functions. Standalone nodes do not use network 14.

SCADA nodes run the data acquisition and management software. Usually SCADA node's computer 12 resides on the plant floor and has direct connections to the process hardware.

An application node is any node 12 that is running applications other than SCADA.

A view node is an application node that executes the "View" program on CPU 121 of the node's computer 12. "View" is the real-time graphic display program that comes with the graphics package. The term "view node" means that node 12 runs the "View" program, but node 12 can run other applications as well.

Programs

Multitasking

System 10 is a multitasking system. Each node 12 can run many programs simultaneously. Internally critical programs have priority access to system resources and system 10 can preempt a program to respond to a more critical resource request. All programs can be classified into three types: system tasks, user configuration tasks, and user tasks.

System tasks work with the process in real-time. System tasks get instructions from configuration files. They require little or no interaction with the user, and, in general, have priority access to system resources.

Users interact with user configuration tasks to create the instructions and logic that monitors and controls their process. User configuration tasks create and modify configuration files. System tasks read the configuration files when they are started and use the information found in them to execute the assigned tasks.

User tasks are programs that the user interacts with to work with a process or process data. User tasks also use configuration files.

The historical trending application which allows users to sample and archive data comprises three programs. They are: historical assign, historical collect and historical display. Historical assign, a user configuration task, is used to define the data points to be archived. Historical collect is a system task that performs the data archiving based on the configuration file created by historical assign. Finally, historical display is a user task that allows users to display archived data on trend charts.

Some programs may serve more than one kind of task. For example, the database builder is a user configuration task for creating process databases. It also acts as a user task allowing users to display real-time data in spreadsheet form.

Basic Architecture

System 10 builds on the instrumentation installed in a plant, e.g., control devices (such as valves) and measurement devices (such as temperature gauges and scales). Typically a plant has a network of sensors and controls connected to I/O devices such as programmable logic controllers. System 10 gives the user real time access to this data, as well as the ability to automatically control the process.

Scan Alarm and Control Program

SAC is a system task that runs on a SCADA node 12.

Networking

Networking design incorporates two basic principles: true distributed processing and on-demand data transfer.

In a distributed processing network 14, each node 12 independently executes the tasks assigned to it. When node 12 requests data from an off-line node 12, networking software notifies requesting node 12 that data is unavailable so that requesting node 12 handles the loss of data gracefully. Even though each node 12 has integrity as an independent station, nodes 12a–12h can also carry on intensive network communication. For example, a view node 12 can display a picture on display 120b with links to many different SCADA nodes 12e–12h over network 14.

Each view node 12a–12d can access data from any SCADA node 12e–12h on network 14. Users selectively configure which nodes 12a–12h communicate with SCADA nodes 12e–12h. A communication link between two nodes 12a–12h over network 14 is called a "session". When node 12 establishes a session with a SCADA node 12, data and alarms can be sent between the nodes 12a–12h. System 10 reads and writes data on demand on a point-by-point basis. Only requested data moves over network 14.

Alarming

System 10 provides a system for generating, displaying and storing alarm messages. Users are allowed to selectively route alarm messages to one of the following:

any node 12 on network 14, printers connected to a node 12, disc-based files, and alarm summary displays.

On a local node 12, the programs that perform these alarm functions are called alarm tasks.

Tagnames

All programs that execute on nodes 12a–12h of system 10 have a standard method for accessing database information. In order to access data three names are needed: (1) the SCADA node 12 name where the target database resides, (2) the target database block name, which is also called a database tag, and (3) the target field name in the database block. Taken together, these three values uniquely define a data point. The format for accessing database information is as follows: node:tag.field.

STRUCTURE AND OPERATION

Figure 3:
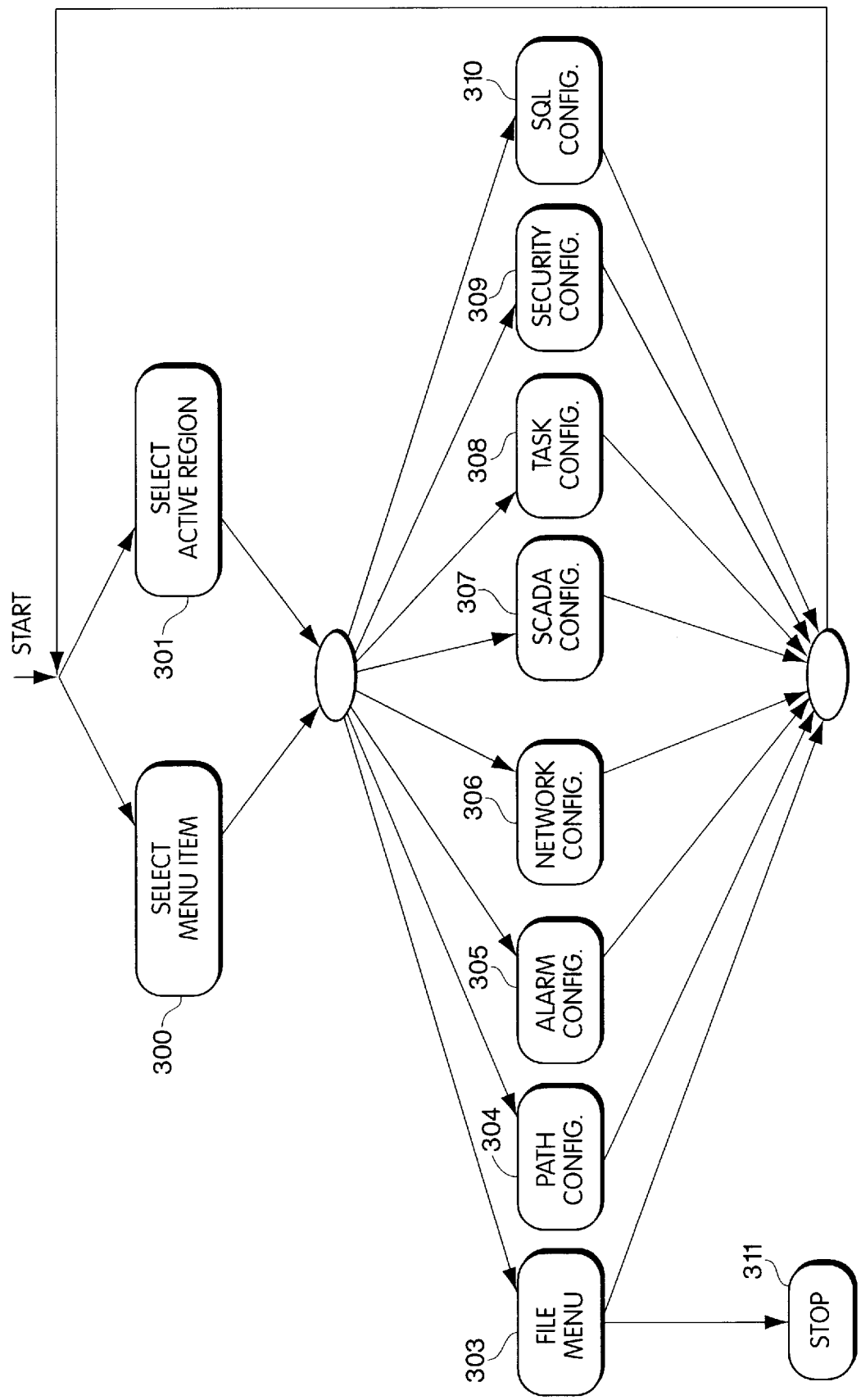
FIG. 3 shows the control flow structure of the SCU.

FIG. 3 shows a user's perspective of the configuration of system 10 using SCU program 124 on any node 12a–12h. When system 10 is started, SCU program 124 is loaded into memory 123 of node 12 (e.g., as program 124b in memory 123b of view node 12d).

Figure 4:
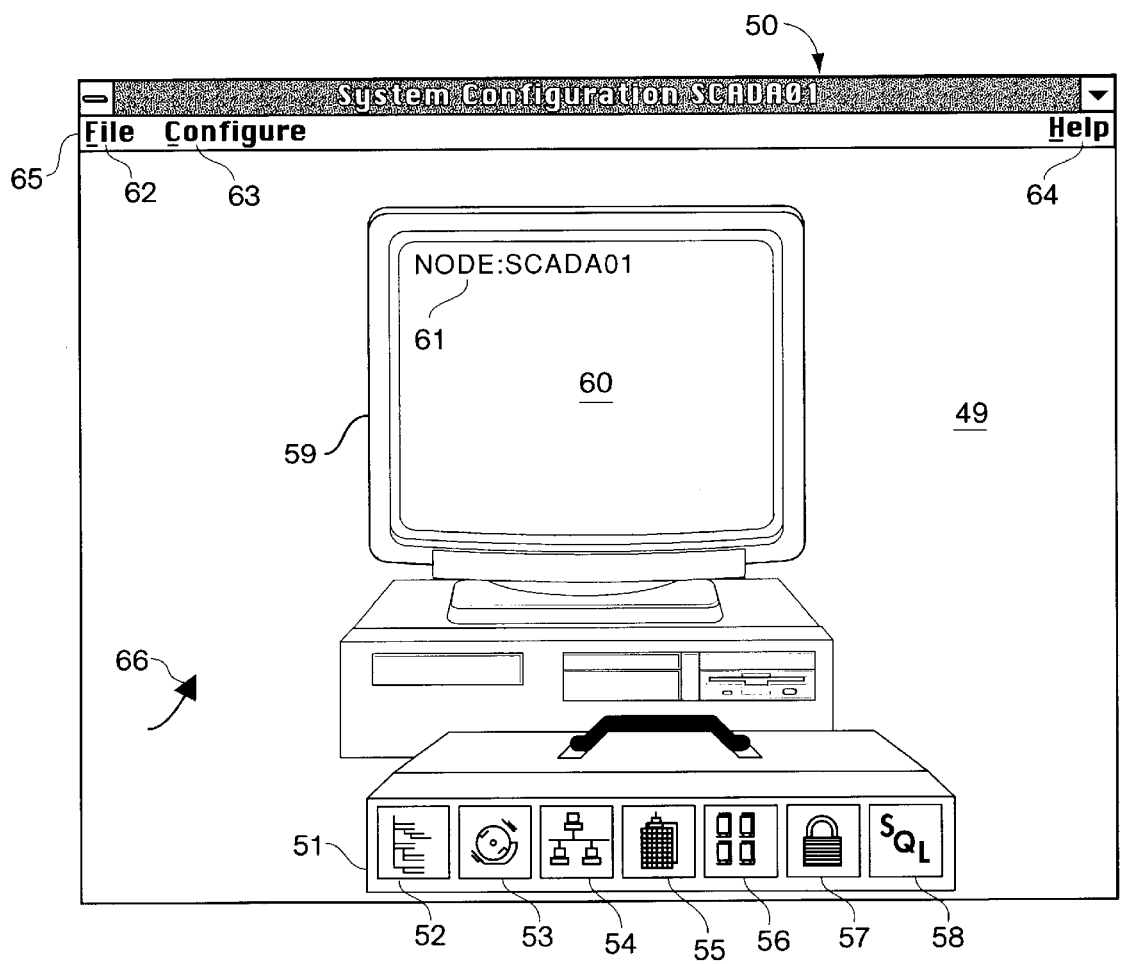
FIG. 4 shows a user-responsive interactive display of an SCU that can be used to configure the system of FIG. 1 from any node.

FIG. 4 describes SCU window 50 which is displayed on display 120 of either a SCADA or view node 12 when SCU program 124 in memory 123 is executed on CPU 121 of that node. At each point during the SCU configuration process, SCU window 50 displays graphical objects (such as icons) that represent enabled data processing features (e.g., processing options and tools) in the actual system 10 that is being configured.

Referring to FIG. 4, SCU window 50 has a number of parts, described briefly here. Menu bar 65 gives users menu control over various options. There is a file control menu 62, titled "File", a configuration control menu 63, titled "Configure", and help menu 64, titled "Help". Tool box 51 is displayed on the bottom portion of screen 49 of SCU window 50. Tool box 51 contains a number of icons 52–58. Each of these icons 52–58 represents an active region of screen 49 which is selectable via the input device 122, e.g. a mouse 122b. At startup, screen 49 also contains a graphical representation of a workstation 59 with display 60. Display 60 of workstation 59, along with other portions of screen 49, are used by SCU program 124 to give the user a constant view of the state of the actual system 10 being configured. For example, the name 61, "SCADA01", of the current node on which SCU program 124 is running is shown on display 60.

The discussion below will describe the changes to display 60 and screen 49 as the configuration progresses.

Selection

In the discussion that follows, the term "select" is used with reference to users selecting either menu items or parts of a graphic displayed on display 120 of node 12. (Note, by convention, one letter in each displayed menu name in SCU program 124 is always underlined. One letter in each entry of each list of options for each menu is also always underlined. In other words, each menu is uniquely identified by one letter. Similarly, each option in a menu's list of options is uniquely identified by one letter.)

Using an input device 122, a user selects a menu item as follows:

If input device is keyboard (122b, 122d) then press the key corresponding to the underlined letter in the menu's name, e.g., referring to FIG. 4, press "H" for "Help" menu 64, "F" for "File" menu 62, or "C" for "Configure" menu 63. A list of named menu options corresponding to the selected menu then appears on screen 49 on display 120. Next type the key on keyboard 122 corresponding to the underlined letter of the required menu option.

If the input device is mouse (122a, 122c) then position cursor 66 over the required menu's name in menu bar 65 and click mouse 122 button. A list of named menu options corresponding to the selected menu name then appears on SCU window 50 on display 120. Next position cursor 66 over the required named menu option and click mouse 122 button.

In order to select an icon or other region on SCU window 50, use input device 122 to position the cursor over that icon or region and then, if input device 122 is keyboard (122b, 122d) press the "Enter" key, if input device 122 is mouse (122a, 122c) click the mouse button.

When the user selects one of icons 52–58 in toolbox 51, the dialogue box corresponding to that icon appears on a field of display 120, covering part of screen 49 of SCU window 50. Users can select one of many parts of SCU window 50 in order to perform the actions required to configure the option corresponding to the selected part. These actions typically include presenting, on display 120, the user with a dialogue box corresponding the configuration options specific to the selected part or option.

As the user progresses through the configuration of system 10 using SCU program 124, screen 49 is modified with symbols that represent the current status of the configuration (i.e., symbols are added to represent each data processing feature that has been configured). During this modification, more portions of screen 49 become active and thereby responsive to selection.

Referring to FIG. 2a, as the user progresses through a typical configuration of system 10, an SCU data structure 125 (FIG. 1) is modified and maintained in memory 123 of node 12. In particular, SCU program 124 maintains a list of all selectable areas, the active region list 212. Active region list 212 contains (for the particular setup) all regions of screen 49 which a user may select in order to perform a function. The active regions are stored in "bounding rectangle" field 266 of each individual entry 2120 in active regions list 212 (FIG. 2g). When the user selects an active region 2120 the action associated with that area, identified by "callback function" field 267 of 2120, is performed. The function identified by field 267 is executed on CPU 121 with data 268 of currently active region 2120.

FIG. 3 represents the control flow diagram of SCU system 124. Note that, after the start, the user can select one of the configuration dialogue boxes either by selecting a menu item 300 or by selecting an active region 301. Depending on which item is selected the appropriate configuration action is performed.

Referring to FIG. 3, the user may select any configuration option 304–310, perform the associated configuration, and repeat as desired. When done, the user selects "Stop" option 311. If the user selects "Stop" option 311 from "File" menu 303, then SCU program 124 gives the user the option of saving any changes made to the system 10, as reflected in SCU data structure 125, in a named file. The "miscellaneous" field 211 of SCU data structure 125 also keeps track of whether the description of system 10 being created has been stored has been changed. This information is used in order to query the user as to whether or not the changes should be saved in a file at the end of a configuration session.

At any point while running the SCU program the user may save the current status of the configuration of system 10, contained in SCU data structure 125 in memory 123, into a file. Saving the configuration is done by choosing the "save" or "save as" options from "file" menu 65. Using SCU program 124, users create configuration files for nodes 12a–12h on network 14 other than the node 12 they are currently executing on. Multiple configuration files may be saved depending on the configuration required.

A user may also begin the configuration session by opening up a configuration file previously saved using the "File" menu 65 "Open" option. When this is done, display 120 will update SCU window 50 to graphically represent the configuration which was opened. When a configuration file is opened it updates screen 49 to refer to the current status of that configuration. This updating includes updating the active areas on screen 49 so that cursor 66 may then be used to select those areas to access the dialogue boxes.

Active Regions

Referring to FIG. 2g, for each particular configuration, SCU program 124 maintains an "Active Region List" 212 in SCU data structure 125. These active regions are regions of screen 49 (FIG. 3) that become responsive to user selection after some aspect of system 10 has been configured. These regions provide users with shortcuts to many of the configuration tasks that they have to perform.

SCU program 124 maintains a count of the number of currently active regions 254. To determine if the cursor is in an active region, SCU program 124 examines "Active Region List" 212, to detect whether the cursor is within a bounding rectangle 266 of any Active Region 2120. If so, that region becomes the current selected area.

Associated with each Active Region 2120 is dialogue call back function 267 and data pointer 268 which contains data for the dialogue call back function 267. The function and dialogue box corresponding to dialogue call back function 267 of the current selected area is executed by SCU program 124 using the data which it finds by following data pointer 268. This allows the dialogue box to be brought up with the appropriate data and not in its default or generic form. This also allows users to manipulate (e.g., delete or modify) objects corresponding to selected areas via their iconic representations on screen 49, because SCU program 124 is able to determine, for each selected area, which object must be manipulated, by looking in the data in the area referenced by data pointer 268. These selected areas, or so-called "hot spots" give users a level of indirection into the dialogue boxes for specific dialogue and specific data. Users are able to modify selected configuration aspects without going through a series of menu or icon choices. They may simply refer to the icon corresponding to the choice they wish to make. Hot-spots can also be used to delete aspects of the configuration.

Path Configuration

Figure 5:
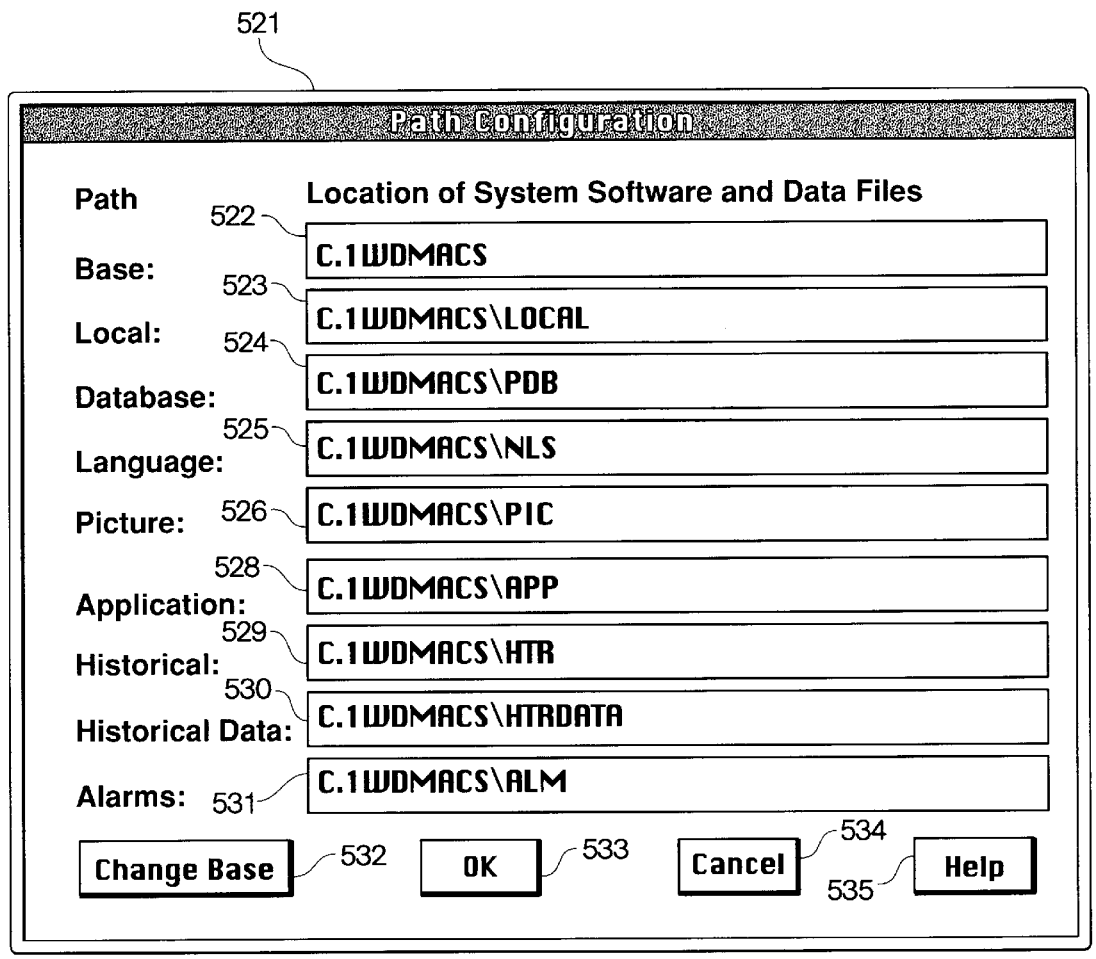
FIGS. 5–19 show various message dialogue boxes and changes made to the display of FIG. 4 that occur while the user is configuring the system of the invention.

A number of directories are used to store program and data files in system 10. The "path configuration" dialogue box 521, shown in FIG. 5, is used to specify the locations and names of the directories needed. In order to access this dialogue box, the user either selects the "paths" entry from "configure" menu 63 or selects path icon 52 of toolbox 51. Either way, "path configuration" dialogue box 521 appears on display 120, fully or partially covering SCU window 50.

When system 10 is first installed, the user specifies the directory where the files are to reside. The install program creates that directory, called the "base directory", as well as all the subdirectories shown in the path configuration dialogue box 521. If the user changes the path field in this dialogue box to a new path, the SCU will create the new directory for the user. It will, however, not copy the files from the old directory to the new directory.

Referring to FIG. 5, "Base" path 522 is used for storing all executable files. Base path 522 points to the main directory. Other directories are usually subdirectories of the base directory. "Local" path 523 is used for storing configuration files associated with the local node 12, including SCU program 124 and system security files. "Database" path 524 is used for storing process database files, database manager configuration files, and I/O driver 24 configuration files. "Language" path 525 is used for storing the language files used to create dialogue boxes and help files. If the user chooses to implement a language other than English, the new language and its associated help files replace the files found in this directory. "Picture" path 526 is used for storing the picture layout and block status display files of the drawn view program. "Application" path 528 is used for storing data and configuration files for applications. If the users create their own applications, this directory is used to store the corresponding data files. "Historical" path 529 is used for storing the configuration files of the historical trending applications program. "Historical Data" path 530 is used for storing historical data files. The historical trending application creates a unique subdirectory below this directory for each node the data is being collected from. The subdirectory uses the name of node 12 the data comes from. "Alarm" path 531 is used for storing alarms data.

As is the case with most dialogue boxes in the SCU, dialogue box 521 includes several "buttons": "Change base" button 532, "OK" button 533, "Cancel" button 534 and "Help" button 535. The user selects "OK" button 533 in order to confirm and select the current configuration. The user selects "Cancel" button 534 to cancel any changes made to the current configuration and "Help" button 535 to bring up a help box on display 120. "Change base" button 532 is used to globally change the base for all files.

Note that the "OK" button 533 box is highlighted (by a square that surrounds the letters "OK"). This refers to the fact that it is the default choice for dialogue box 521. It is a consistent convention in SCU program 124 that a highlighted box or button on a dialogue box is the default choice and will be selected if the user hits the return key on the keyboard (122*b*, 122*d*) without actually selecting any active area (box or button or icon) in the dialogue box.

Once the user has selected all the paths in dialogue box 521 and changed the configuration accordingly, he selects "OK" button 533. When this happens, SCU program 124 stores the modified data from the fields 522–531 of dialogue box 521 in SCU Path Information 203 (FIG. 2*c*, 241–249) of SCU data structure 125 in memory 123 of node 12. SCU program 124 then clears dialogue box 521 from display 120, and returns screen 49 to its previous status. The paths are now set in SCU data structure 125, in SCU "Path Information" area 203 (FIG. 2*a*), although no indication to this effect is shown on screen 49.

Network Configuration

Figure 6:
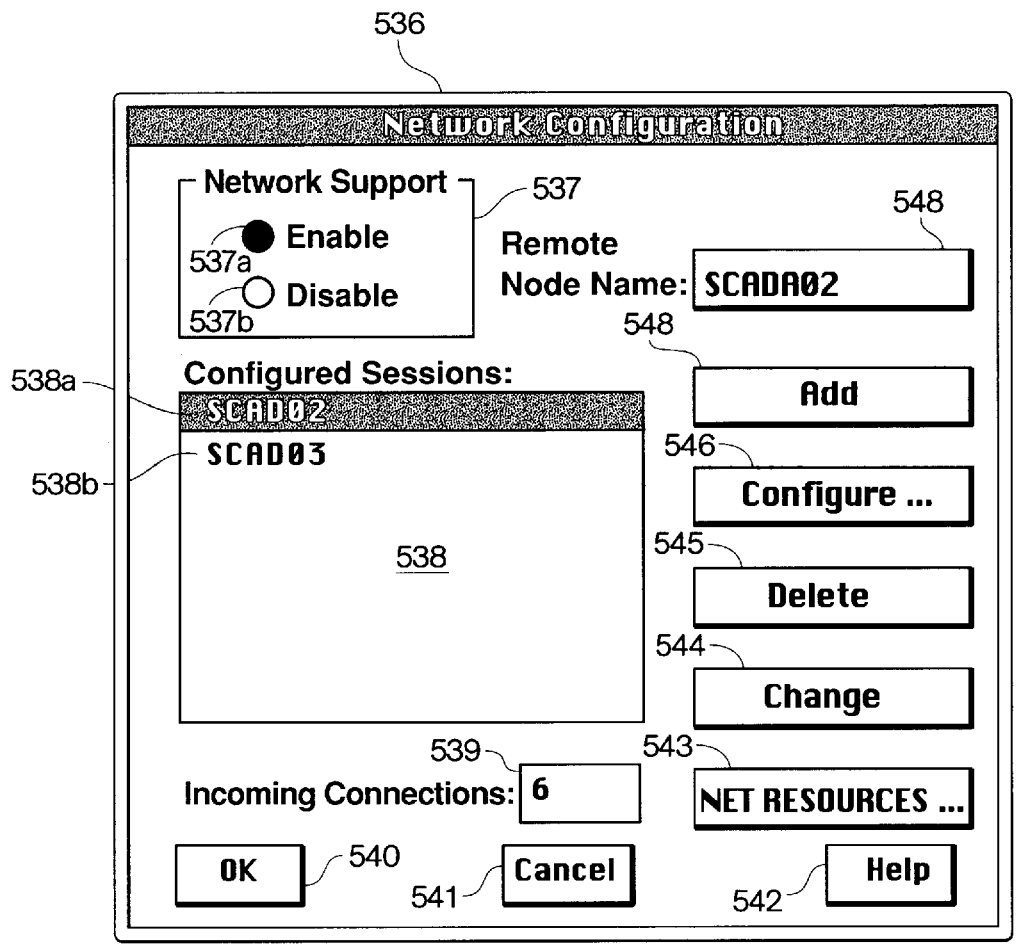

In order to configure network connections, the user may either choose "Network" from "Configure" menu 63 or may select "network" icon 54 from toolbox 51. Using either method, "Network Configuration" dialogue box 536, shown in FIG. 6, is created on display 120. This dialogue box 536 is used to configure network sessions on remote nodes.

Note that dialogue box 536 fully or partially covers screen 49. While dialogue box 536 is shown on display 120, i.e., until the user selects either "OK" button 540 or "Cancel" button 541, none of the active regions of "System Configuration" screen 49 are responsive to selection. The same approach is used throughout SCU, i.e., any dialogue box created by SCU becomes the only region of display 120 responsive to selection.

In order to add networking capability to a node 12, a user selects "Enable" button 537*a* in "Network Support" box 537. This changes node 12 from a standalone node to a network node. To disable network support of a node 12, the user selects "Disable" button 537*b*. The choice of "disable" 537*b* disables all other options in "Network Configuration" dialogue box 536.

Once network support is enabled, the user must specify which remote SCADA nodes the local node needs to communicate with. To add node 12 to the configured session list 538, the user follows the following procedure: (1) Type the node name in "Remote Node Name" field 548 using keyboard (122*b*, 122*d*); and (2) Select "Add" button 547. SCU program 124 now adds node 12 to the bottom of "Configured Sessions" list 538, for example, "SCADA03" 538*b* (FIG. 6). By selecting the node name in "Configured Sessions" list 538, the name becomes highlighted, as in "SCADA02" 538*a*. With the node name highlighted in "Configured Sessions" list 538, the user can then configure that particular network session by selecting "Configure" button 546.

Figure 7:
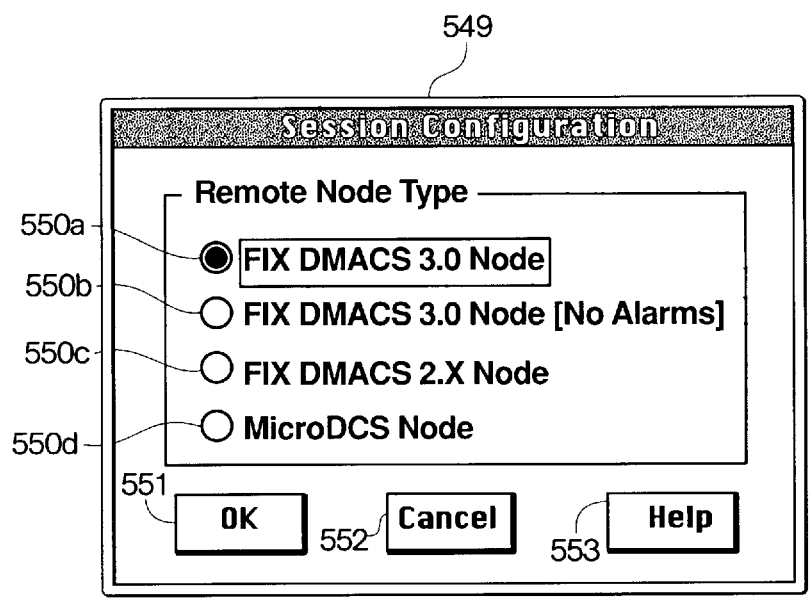

When this happens, "Session Configuration" dialogue box 549 (as shown in FIG. 7) appears. The user selects one of the appropriate node types from options 550 that are listed in box 549 and then selects "OK" button 551. Once again, this dialogue box also has "Cancel" button 552 and "Help" button 533. When the user selects "OK" button 551 or "Cancel" button 552, "Session Configuration" dialogue box 549 is removed from screen 49 and "Network Configuration" dialogue box 536 becomes active once again.

In order to make a change to a node 12, the user selects the node name from "Configured Sessions" list 538, the node name will be highlighted and displayed in "remote node name" field 548, the user can then edit the name. When complete, the user selects "Change" button 544 and the old name changes to the new name.

In order to remove node 12 from "Configured Sessions" list 538, the node is selected and the highlighted node can be removed using "Delete" button 545.

If node 12 on which SCU program 124 configuration is running is a SCADA node, the user can control how many nodes can have sessions with it at any one time. "Incoming Connections" field 539 is used to prevent too many nodes from accessing SCADA node 12 and tying up system resources.

Figure 8A:
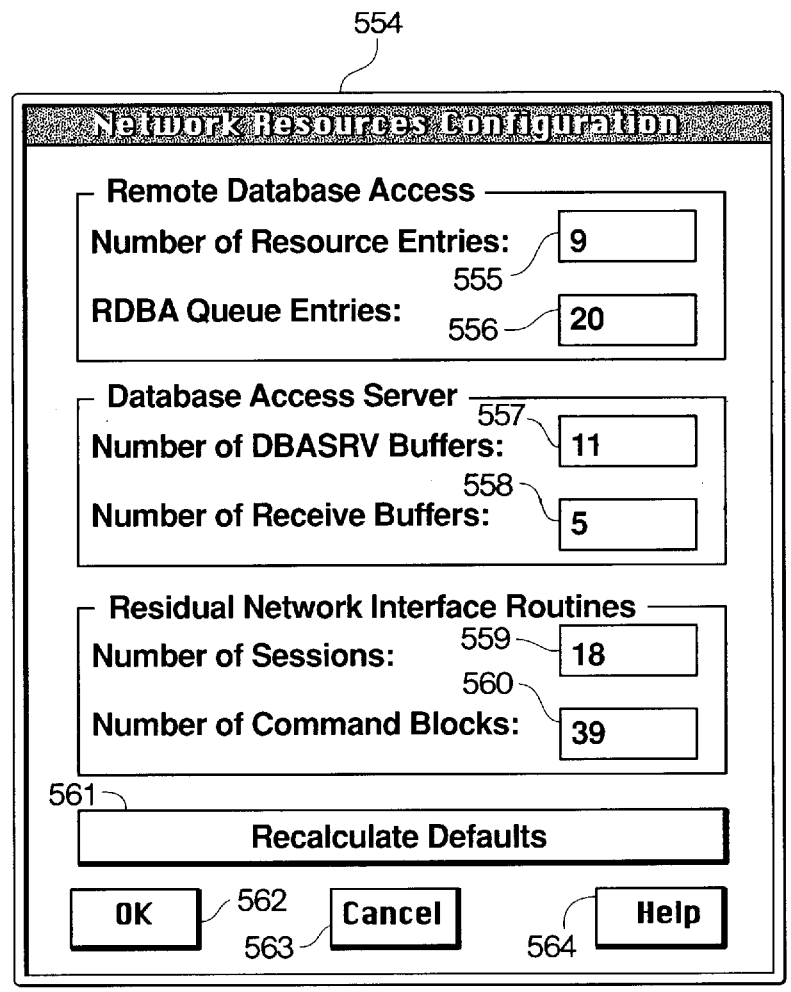

If the user wishes to modify network resources, he selects "Net Resources . . . " button 543. This will cause "Network Resources Configuration" dialogue box 554 (FIG. 8*a*) to be presented on screen 49. Most users never need to modify the defaults shown in box 554, it exists primarily as a tool for technical support engineers. "NETBIOS Configuration" dialog box 565 is displayed when "OK" button 540 is selected and the current configuration for netBIOS does not have enough resources for the current network configuration. NetBIOS parameters are set independently of the system. NetBIOS resources are not setup as part of the Network Resources configuration.

When the user has completed network configuration, he selects "OK" button 540 in "Network Configuration" dialogue box 536. Referring to FIGS. 2*a* and 2*e*, when the user selects "OK" button 540, SCU program 124 updates "SCU Network Information" field 205 of SCU data structure 125 in memory 123 of node 12. A count 254 of the number of configured sessions is stored in field 205. For each session in "Configured Sessions" list 538 (FIG. 6), there is an entry 2051 in field 205. For each of these sessions SCU program 124 updates their session information 252 and their network resources 253.

Figure 8B:
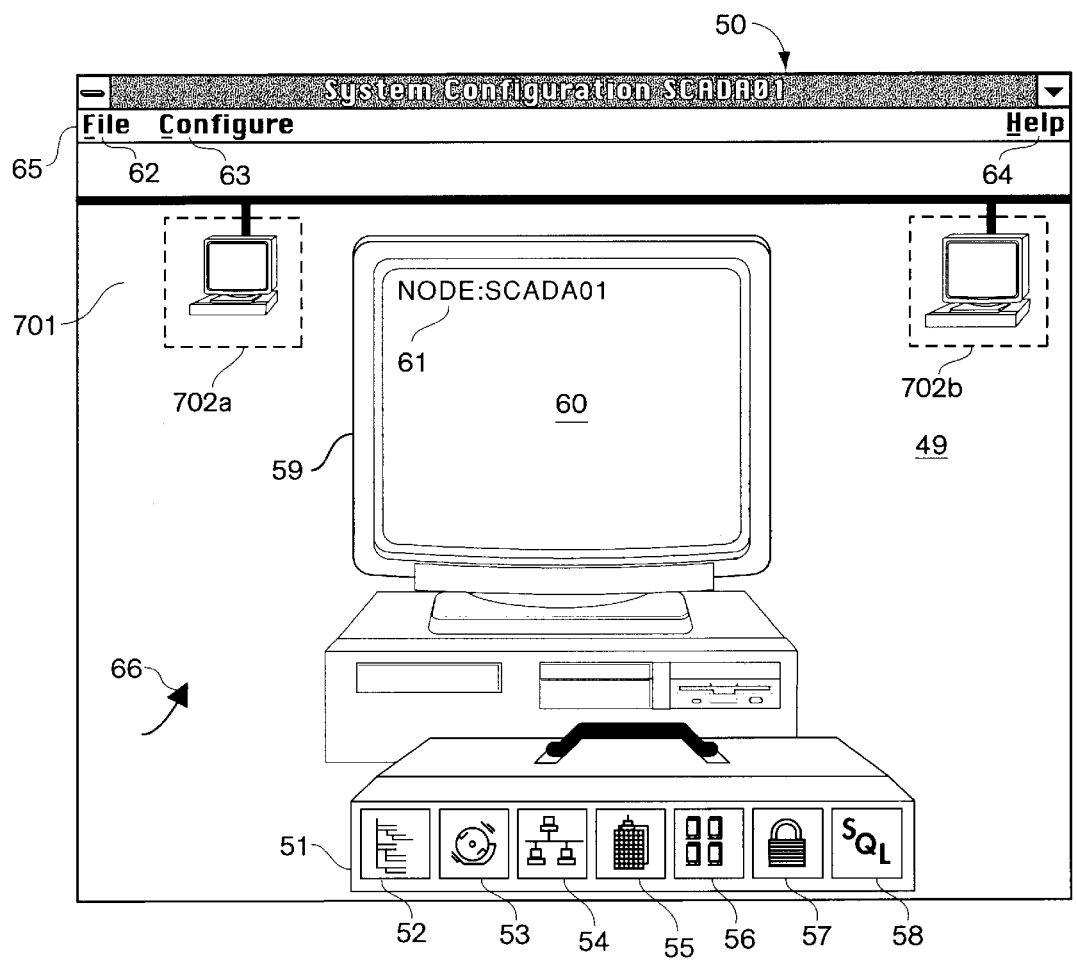
Figure 9:
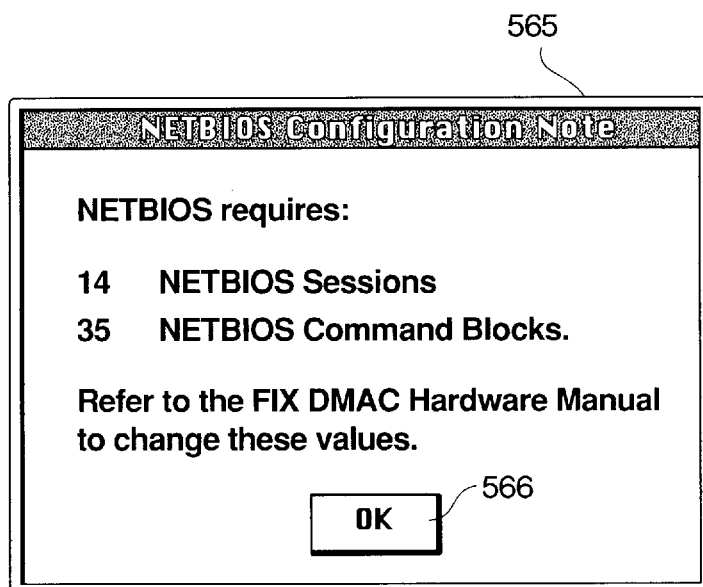

Configuring network 14 in the manner described above, causes SCU program 124 to modify screen 49, as shown in FIG. 8*b*. Screen 49 now contains a representation of a network as shown by line 701 and representations of computer displays 702*a*, 702*b*. Furthermore, the representations of terminal devices or computer devices 702 on screen 49 are active regions, or hot-spots, of screen 49 which the user may select in order to once again bring up "Network Configuration" dialogue box 536 (FIG. 6). This is shown in FIG. 8*b* by the dotted lines around 702*a* and 702*b*, which do not, in fact, appear on screen 49.

Alarm Configuration

In order to configure alarms, the user either selects "Alarms" from "Configure" menu 63 or selects alarm icon 53 from toolbox 51. This action causes "Alarm Configuration" dialogue box 570 (FIG. 10*a*) to be presented on screen 49. "Alarm Configuration" dialogue box 570 has four purposes: to enable alarms, to specify incoming alarm routes for enabled tasks, to specify alarm routes for outgoing operator messages generated at the local node, and to modify network resources used by the alarm task queues.

There are seven alarm tasks as described below. To enable an alarm task, the user selects the task from task list 579, and selects "Enable" button 571 in the "Status" block.

The seven alarm tasks are as follows:

"Alarm printers 1–4"—the user can enable up to four separate printers with similar or different routing strategies.

"Alarm summary service"—enables the alarm queue that supports alarm summary links in the view program.

"Alarm file service"—stores alarm and operator messages in ASCII files in the local nodes alarm directory. Its tasks stores all alarms and messages for a date in one file.

"Alarm network service"—when enabled, this alarm task sends alarms and operator messages generated at the local node over network 14 and receives network alarms for the local node.

Figure 11:
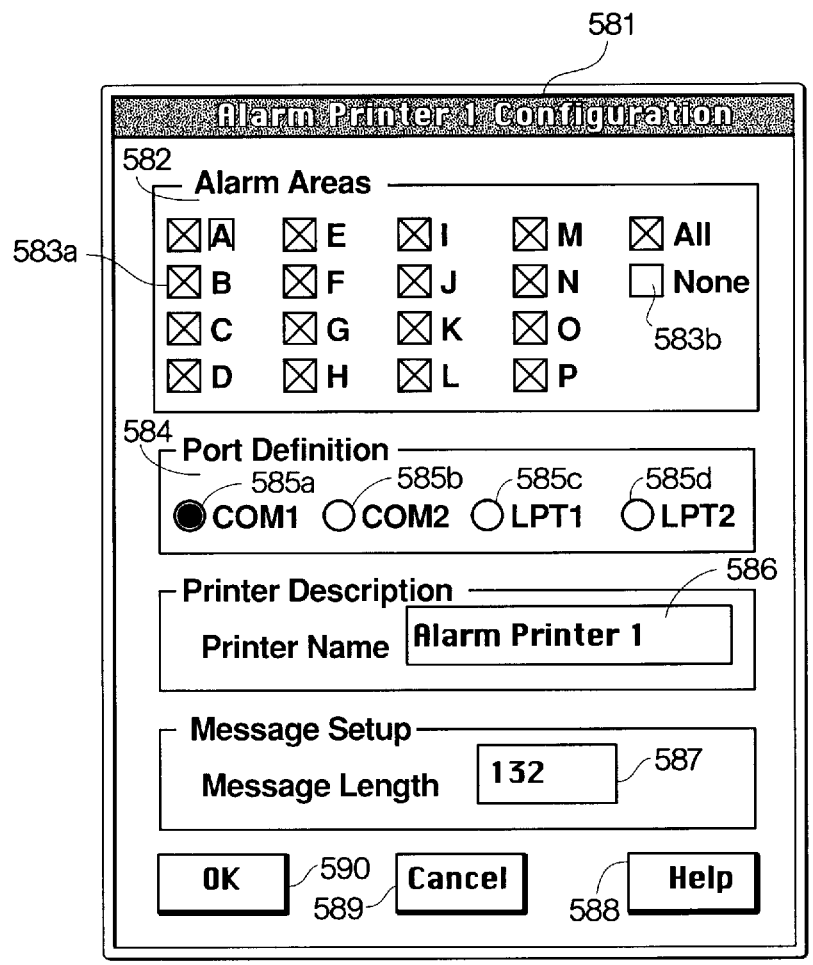
Figure 12:
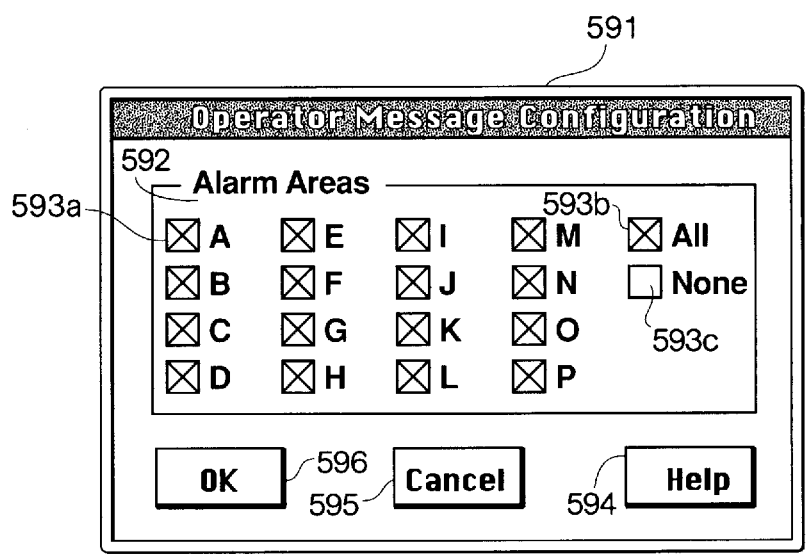
Figure 13:
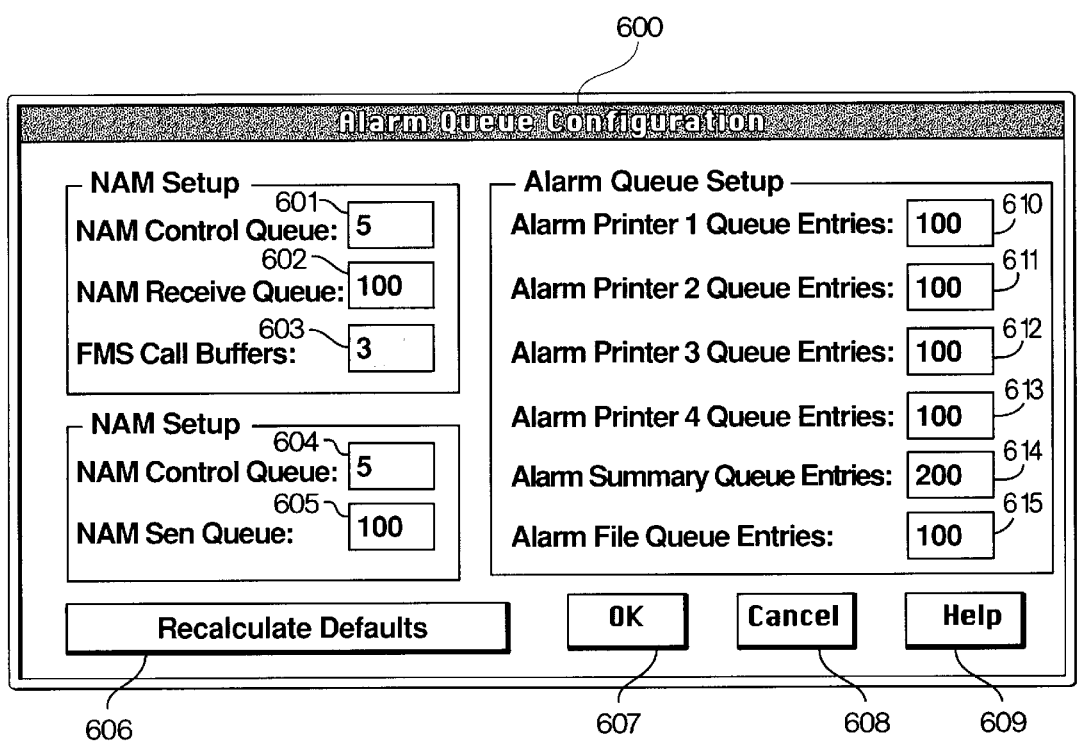

Users can configure several settings of each alarm task, except for alarm network service tasks. In order to configure or modify a specific alarm task, the user either selects that task from task list 579 and selects "Modify . . . " button 573, or, using mouse (122*a*, 122*c*) the user can "double click" on the name of the task in task list 579. The task configuration dialogue box that is presented on screen 49 in response to this action depends upon which type of alarm is chosen. (FIGS. 11–13 show the various alarm configuration dialogue boxes.) It will, however, contain at least these sections: alarm area configuration (for all tasks), port definition (for all printer tasks), printer description (for all printer tasks), and message setup (for all printer tasks and alarm file tasks).

FIG. 11 shows "Alarm printer 1 Configuration" dialogue box 581. The printer name is shown in "Printer Description" box 586. The "Alarm Areas" 582 check boxes 583 control which alarm and operator messages the alarm can receive. The user checks each area to receive incoming alarms and operator messages routed to that alarm area.

Users can control the length of the alarm message for each particular alarm by specifying a length in "Message Length" field 587. If users are printing to an 80 column printer, then they may specify a length longer than 80 characters. However, the message would be truncated at 80 characters. The message may also wrap to the next line. This is entirely dependent on the printer hardware.

For each windows printer task, users may connect the printer to serial ports "com1" 585*a* or "com2" 585*b* or parallel ports "lpt1" 585*c* or "lpt2" 585*d*. Each port can handle only one alarm printer task. The user selects the desired port under "Port Definition" section 584. Rather than use the generic title, "Alarm Printer 1" for this alarm, the user may change the name of the printer task as it appears in "Alarm Configuration" dialogue box 586. To do this the user types the new name (up to 32 characters) in "Printer Description" section 586.

When a particular alarm task has been satisfactorily configured, the user returns to "Alarm Configuration" dialogue box 570 (FIG. 10*a*) by selecting either "OK" button 590 or "Cancel" button 589.

By default, operator messages generated on the local node are logged to all alarm areas. In order to change this, the user selects "Operator Messages Configuration" 578 (FIG. 10*a*) which brings up "Operator Message Configuration" dialogue box 591 (shown in FIG. 12) on screen. 49. The "Alarm Areas" check boxes 592 control which alarm areas receive the operator message. The user may check each area he wants the messages logged to. Many users reserve one alarm area exclusively for operator messages.

Figure 10A:
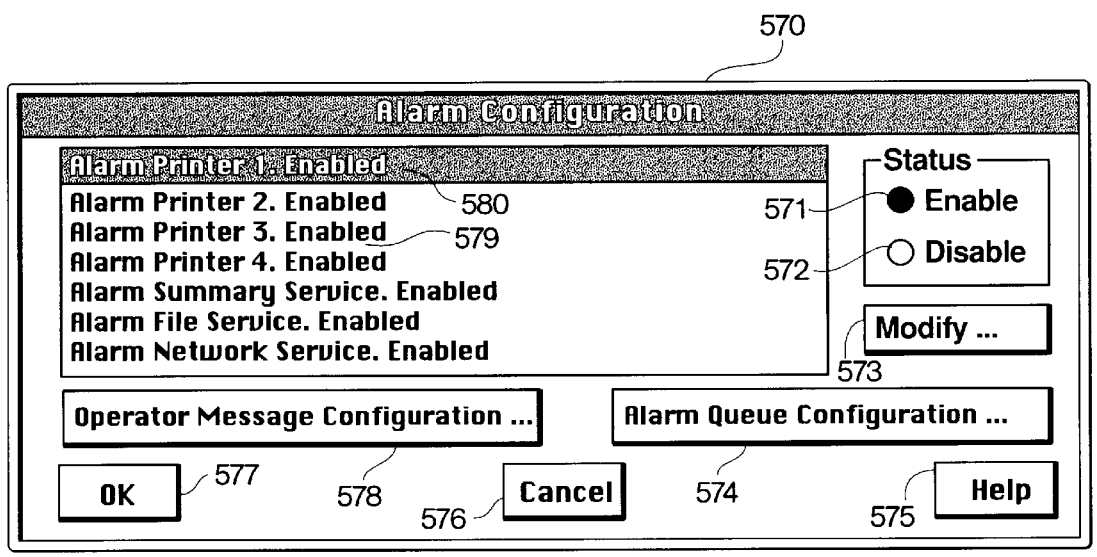

When a non-SCADA node (e.g., a view node 12–12*d*) generates operator messages, node 12*a*–12*d* directs messages to the first SCADA node (e.g., "SCADA02") listed in "Configured Sessions" list 538 of "Network Configuration" dialogue box 536 (FIG. 6). The SCADA node distributes the transferred operator messages according to the scan nodes alarm and network setup. When the user has completed configuring "Operator Message Configuration" dialogue box 591, he selects "OK" button 596 or "Cancel" button 595 and returns to "Alarm Configuration" dialogue box 570 (FIG. 10*a*).

In order to configure the alarm queue, the user selects "Alarm Queue Configuration . . . " button 574. This will bring up "Alarm Queue Configuration" dialogue box 600, shown in FIG. 13, on screen 49. Users employ "Alarm Queue Configuration" dialogue box 600 to change the number of alarm messages that system 10 can hold in its alarm queues. SCU program 124 uses entries from other dialogue boxes to tailor the alarm queue resources precisely for each configuration. Most users never need to modify these defaults. Modifying alarm queue resources could seriously effect the performance of node 12 and users are discouraged from resetting them.

Figure 14:
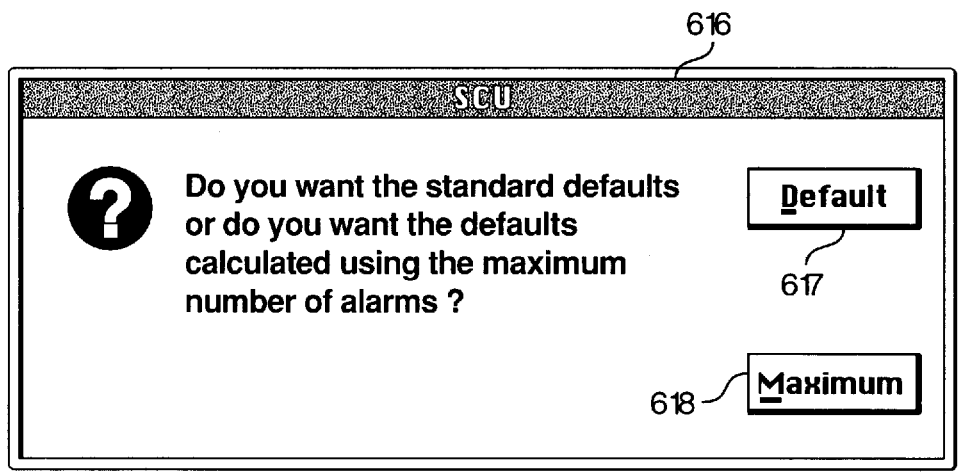

In "Alarm Queue Configuration" dialogue box 600, each enabled task lists the maximum number of alarms it can handle at any one time in entries 610–615. Enough system resources are reserved to hold a specified number of messages in memory until an alarm task can handle them. If more messages come in after a queue is full, the messages cannot be logged. To use the system default, the user selects "Recalculate Defaults" button 606. An "SCU" message box 616, as shown in FIG. 14, then appears on screen 49. The user then has the choice of either using the standard defaults by either pressing the return key on keyboard (122b, 122d) or selecting "Default" button 617. The user may also want the maximum number of alarms calculated. This can be done either by choosing "Maximum" button 618 or pressing the letter "M" on keyboard (122b, 122d).

Figure 15:
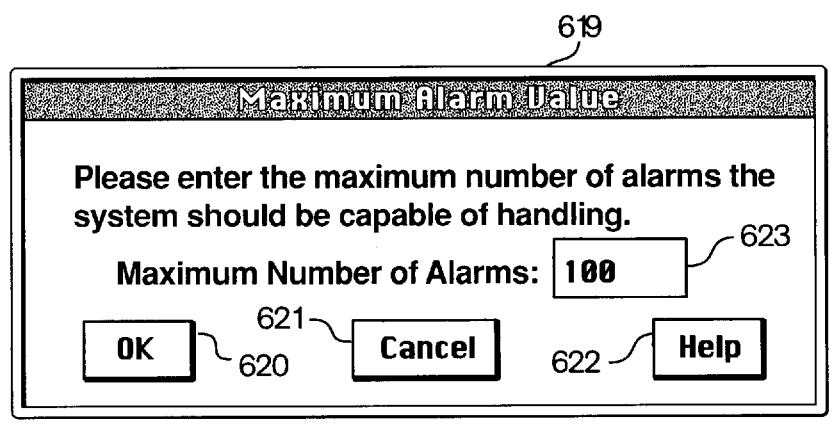

If the user selects "Maximum" button 618, then "Maximum Alarm Value" dialogue box 619 in FIG. 15 will appear on screen 49. The user is then asked to enter the maximum number of alarms that the system should be capable of handling. This is entered in "Maximum Number of Alarms" field 623. Once again the user may then select "OK" button 620, "Cancel" button 621, or "Help" button 622.

Based on the number the user enters in field 623, all alarm queues in the system are changed to reflect this value, except for the alarm summary queue.

When the user has completed all alarm configuration, he selects "OK" button 577 in "Alarm Configuration" dialogue box 570 (FIG. 10a), and returns to screen 49.

Figure 2D:
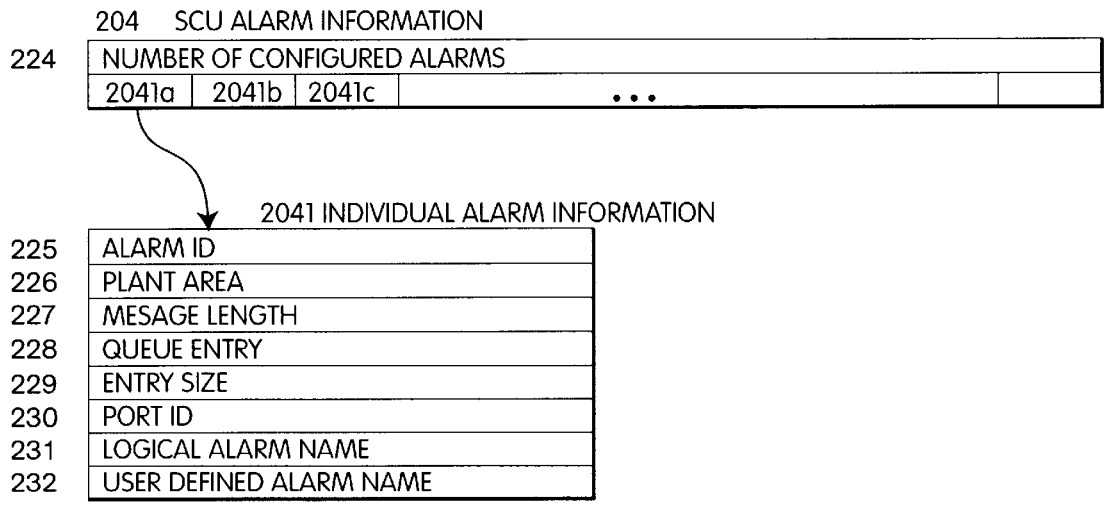
Figure 2E:
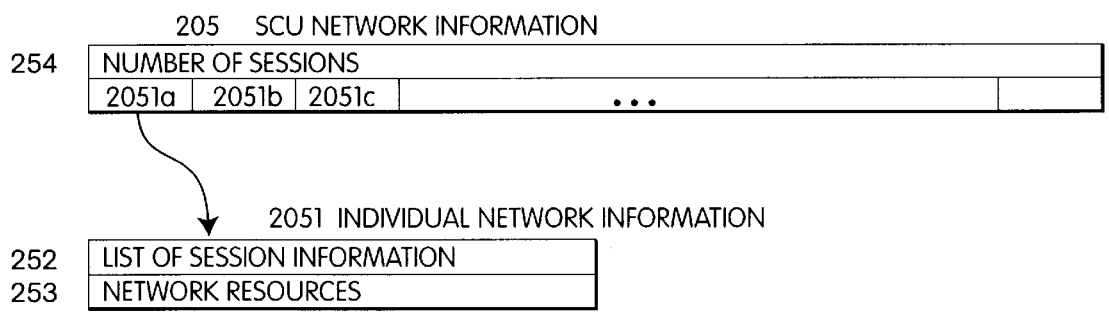

Referring to FIG. 2a, when the user selects "OK" button 577 in "Alarm Configuration" dialogue box 570 (FIG. 10a), SCU program 124 stores the changes in the alarm configuration in "SCU Alarm Information" area 204 of SCU data structure 125. Referring to FIG. 2d, SCU program 124 stores the number of configured alarms in field 224, and for each alarm 2041, SCU program 124 stores configuration information 225–232.

Figure 10B:
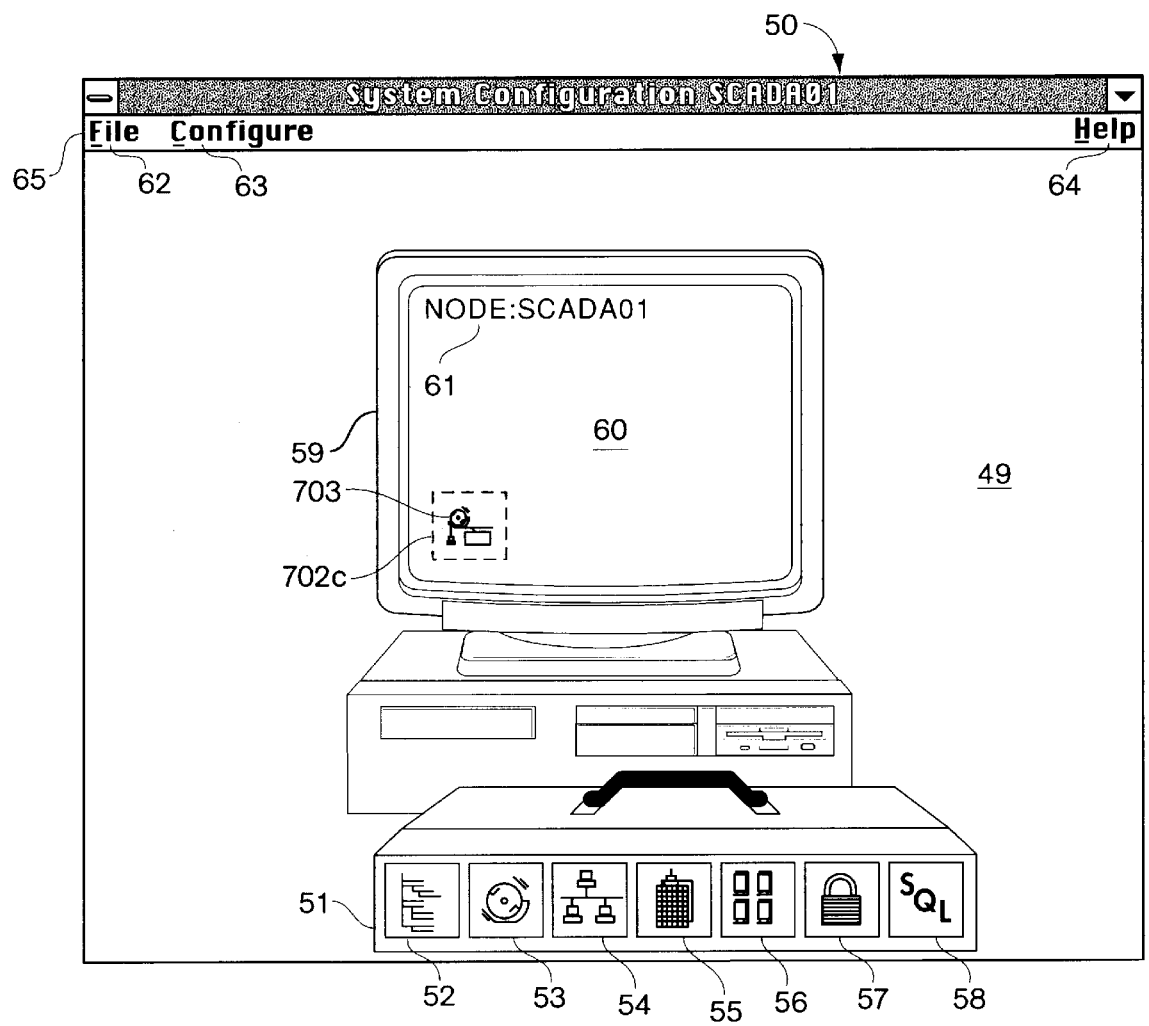

Referring to FIG. 10b, screen 49 now displays an icon 703 in display region 60 for every alarm that has been configured using the procedure discussed above. The area around this icon shown by the dotted line 702c is now an active area of screen 49 that is responsive to selection by input device 122a, 122c and can be selected in order to return back to alarm configuration dialogue box (581 or 600) for the particular alarm corresponding to icon 703. For each alarm that is configured and for various other configurations, display 60 will be changed and a number of icons 703 will appear on the display. Each one of these icons 703 is an active region of the display responsive to the input device, and each icon 73 provides the user with a shortcut to configuring or deleting the alarm task corresponding to that icon. Referring to FIG. 2d, each icon 703 corresponds to an entry 2041 in SCU Alarm Information area 204.

SCADA Configuration

Figure 16A:
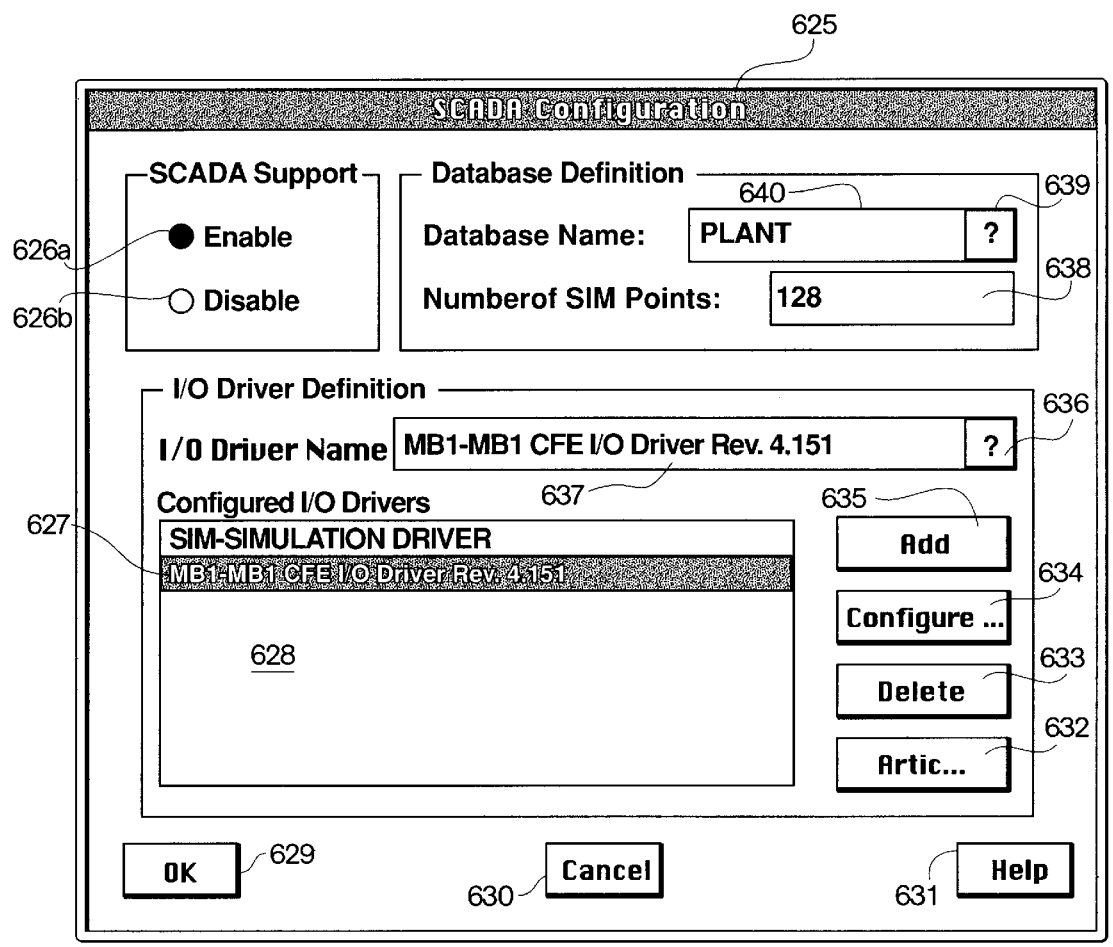

Referring again to FIG. 4, in order to configure SCADA and to establish a SCADA node, the user either selects "SCADA" from "Configure" menu 63 or selects SCADA icon 55 in toolbox 51. Taking either action causes "SCADA Configuration" dialogue box 625 of FIG. 16a to be presented on the screen 49 and become the active region of the display.

Users use dialogue box 625 to enable or disable SCADA options and to specify the names of I/O drivers that the users wish to use. In order to enable SCADA node 12, the user performs the following steps:

(1) select "Enable" 626a in the "SCADA Support" box;

(2) type the database name in "Database Name" field 640 or use question mark button 639 to produce a list of databases that are currently available;

(3) If the user plans to use a type of driver known as a simulation I/O driver, then the user enters the number of simulated I/O points in "Number of SIM Points" field 638. This number may presently be a value up to 2000;

(4) the user configures the I/O drivers, which will be discussed later;

(5) set up the I/O drivers (not discussed here); and (6) configure the ARTIC card using "ARTIC" button 632, if appropriate.

An ARTIC card is a real-time interface coprocessor card (available from IBM) that is plugged into the backplane of the PS/2 computer. Either the ARTIC card or the CPU and memory of the computer itself may be used. The ARTIC card has the advantage of increased memory space (about 1 megabyte of working memory) over the working memory of the remainder of the PS/2 (approximately 640 Kbytes). However, the ARTIC card runs more slowly than the main CPU. Also, the ARTIC card allows the SCADA node to use up to four I/O devices 16; only two I/O devices 16 can be used if the main CPU and working memory are utilized instead.

If the user chooses "ARTIC" button 632, "Artic Parameters" dialogue box 641 (FIG. 17) is generated on display 120 partially covering "SCADA Configuration" dialogue box 625 (FIG. 16). The user enters the appropriate values (not discussed here) in fields 642–651 and selects "OK" button 653 or "Cancel" button 652.

To disable SCADA, the user selects "Disable" button 626b in the "SCADA Support" box (FIG. 16a) SCU program 124 discards any I/O driver and database information previously entered.

In order to configure an I/O driver (Step 4 above), the user follows the following procedure. The user selects question mark button 636 to display, in a separate dialog box a list of all I/O drivers that have been previously installed on the local node (i.e., the node 12 which the user is using to configure system 10). The user then selects an appropriate driver from list and then selects the "OK" button. The user then selects "Add" button 635. SCU program 124 adds the I/O driver to the list of configured I/O drivers shown in list 628. If the user wishes to remove an I/O driver from list 628, the I/O driver is selected from "Configured I/O Drivers" list 628, and "Delete" button 633 is selected. This action removes the driver from the list; however, it does not delete the driver files from the system.

When the user selects "OK" button 629 in the "SCADA Configuration" dialogue box 625 (FIG. 16a) SCU program 124 stores the updated SCADA configuration in "SCU Driver Information" field 201 of SCU data structure 125 in memory 123 of node 12 on which SCU is executing. SCU updates the number of configured drivers field 269, and for each configured driver (from "Configured I/O Drivers" list 628, FIG. 16a) SCU creates an entry of that driver's information 270.

Figure 16B:
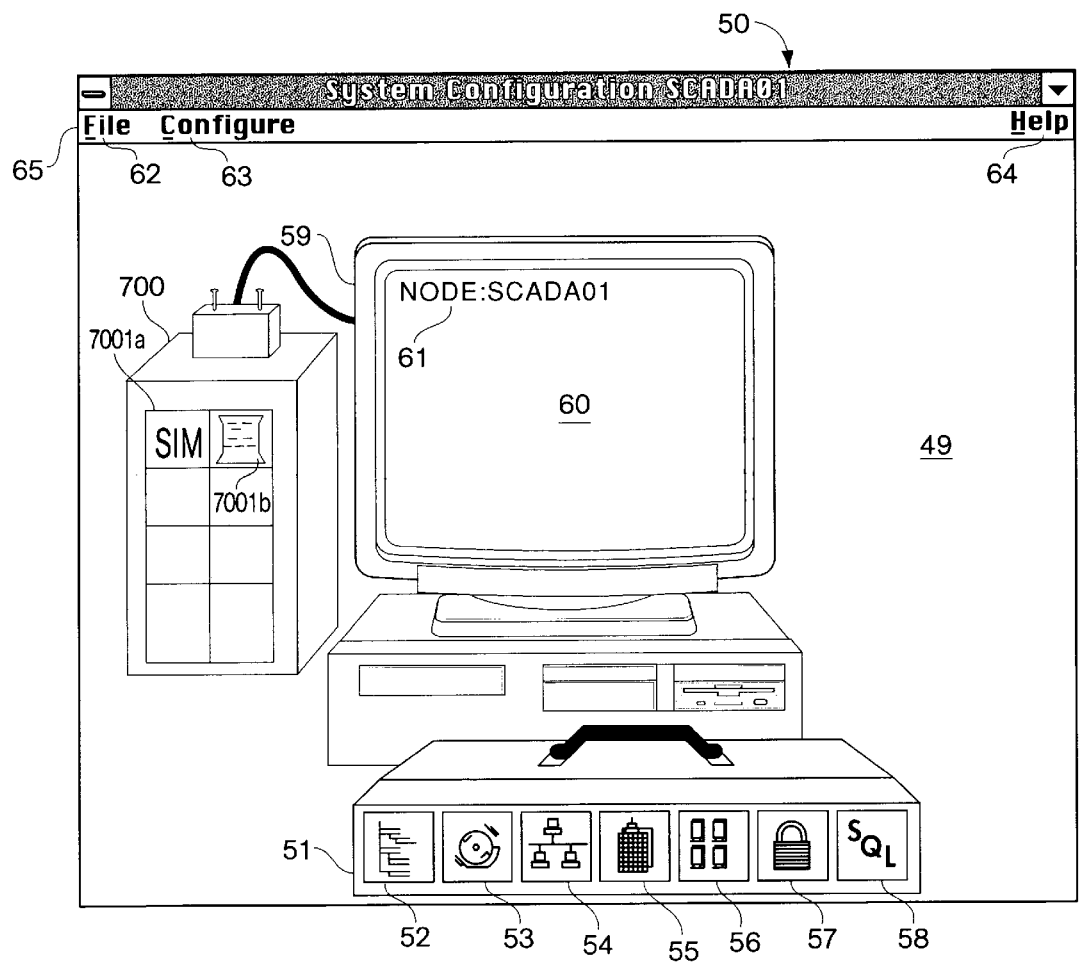
Figure 17:
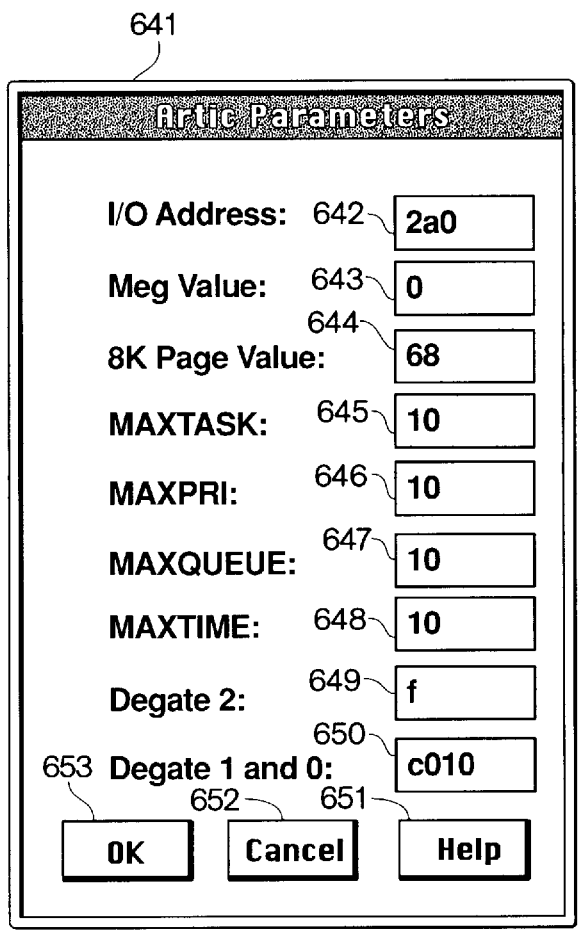

Referring to FIG. 16b, once SCADA configuration is complete, SCU program 124 updates screen 49 to display a representation 700 of I/O drivers. Representation 700 includes iconic regions 7001a–7001b. Representation 700 is an active region of screen 49, shown by the dotted line 702e. Active region 702e, as well as SCADA icon 55 in toolbox 51, can be used to select "SCADA configuration" dialogue box 625 for node 12. Furthermore, each filled-in icon 7001a–7001b (in FIG. 19) corresponds to a configured driver entry 270 in SCU Driver Information area 201 of SCU data structure 125. As is the case with the iconic representations of alarms (described above), each icon 7001 provides the user with a short-cut to the deletion and configuration of the driver that icon 7001 represents.

Tasks Configuration

Figure 18:
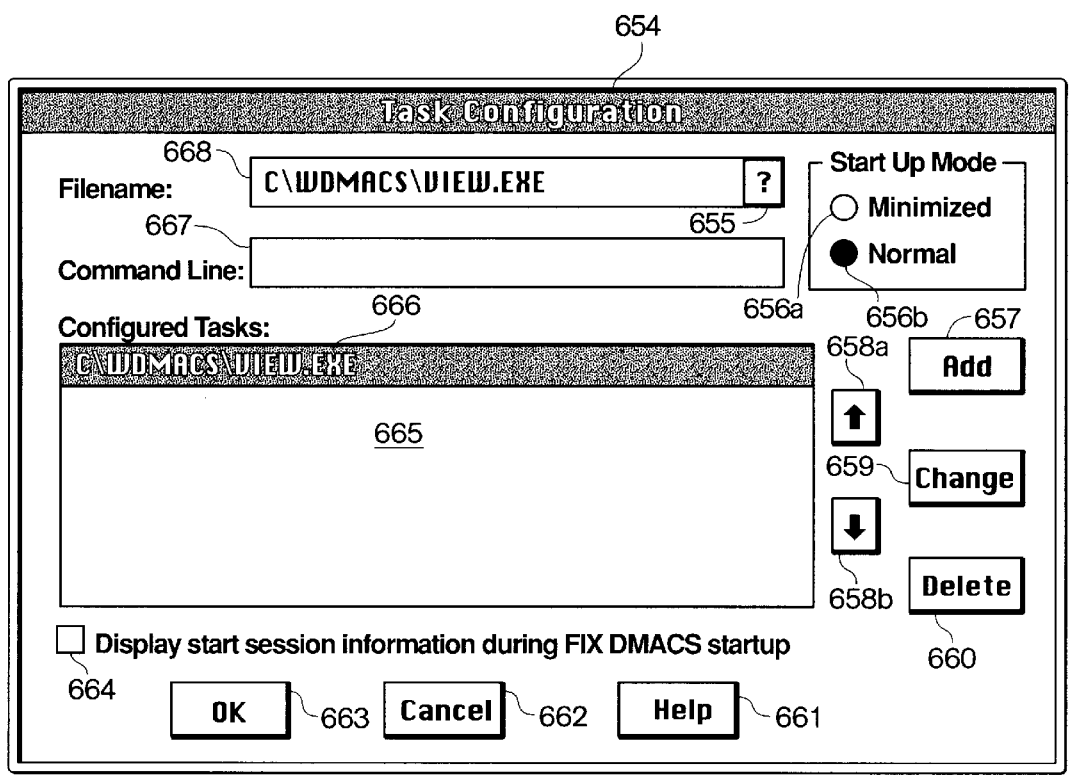

Referring again to FIG. 4, system 10 can be configured to automatically start up programs (tasks) when the start-up program is run. To specify tasks for automatic startup, the user either selects "Tasks" from "Configure" menu 63 or selects "tasks" icon 56 in toolbox 51. Either way "Task Configuration" dialogue box 654 (FIG. 18) appears on screen 49.

In order to add a start up task the user follows the following procedure:

1. Select question mark button 655, in "Task Configuration" dialogue box 654. This will produce, on screen 49, a list of all executable files.

2. Select the appropriate file from the list (it will then appear in "Filename" field 668) and select "Open" from the "File" menu 65. The file can also be selected by double-clicking on it with mouse (122b, 122d).

3. Under the "Start Up Mode" box select either "Normal" button 656b, or "Minimized" button 656a. "Normal" button 656b starts the task with the windows open and "Minimized" button 656a starts the task with the window iconified.

4. If the user needs to specify command line parameters for the current task highlighted in "Configured Tasks" list 665, add those parameters in "Command Line" field 667.

5. Select "Add" button 657. SCU program 124 now adds the task to the bottom of "Configured Tasks" list 665.

6. The tasks are executed in the order of "Configured Tasks" list 665. The user may use "Up" and "Down" buttons 658 to move the start-up order of the tasks in the task list 665.

In order to make a change to the set up of a program already listed, the user can select the program from "Configured Tasks" list 665 and select "Change" button 659.

To remove a task from the task list, the user selects it from "Configured Tasks" list 665 and then selects "Delete" button 660.

When system 10 goes through its startup routine it will notify users as it establishes or fails to establish connections with requested nodes. To suppress these messages, the user deselects "Display start session information" check box 664. When all tasks have been configured, the user selects "OK" button 663. Conversely, to cancel any changes made, the user selects "Cancel" button 662. This returns the user once again to the SCU display (FIG. 4).

Referring to FIGS. 2a and 2f, when the user completes task configuration and selects "OK" button 663, SCU program 124 updates "Startup Information" fields 235–239 of SCU data structure 125 in memory 123 of the node 12 on which the configuration is taking place.

Other Configuration Options

Referring to FIG. 4, toolbox 51 contains two additional icons, security icon 57 and SQL icon 58, not discussed thus far, Each icon 57, 58, when selected, causes SCU program 124 to execute a procedure or another program (which may bring up the appropriate dialogue box on display 120). The user may then interact with these dialogue boxes or programs as was shown in the previous examples to configure the system appropriately.

Certain of the configuration tasks, in particular "Security" and "SQL" in the current implementation, are performed by separate programs which the SCU runs. Once those programs are completed, control returns to the SCU program. Other configurations such as path, alarm, network, and SCADA, for example, are performed by sub-routines which then allow the results of those configurations to be stored directly in the configuration data structure 125.

The security application of system 10 allows users to protect (1) access to programs, (2) access to critical program functions, (3) access to operator display files/pictures, and (4) write access to database blocks.

This security application comes with a security configuration program which enables users to (1) enable or disable security on a node 12, (2) create user and group accounts, (3) assign users rights to use programs and program functions as well as write access to database blocks, (4) assign user names and passwords, and (5) assign security area names. It is this security configuration program that is executed when the user selects security icon 57 indicating that security has been enabled.

If the configuration program that is executed by SCU is a separate program then communication with that program may take place through files which the program can write and the SCU program can read. In this way the SCU can also update its data structure by reading the files created by those programs after those programs have completed. For example in the case of the security program, when it is completed it writes a file which the SCU program will look for. If that file exists, the SCU program will update the display 60 with a picture of a lock similar to the lock shown in icon 57.

Example

Figure 19:
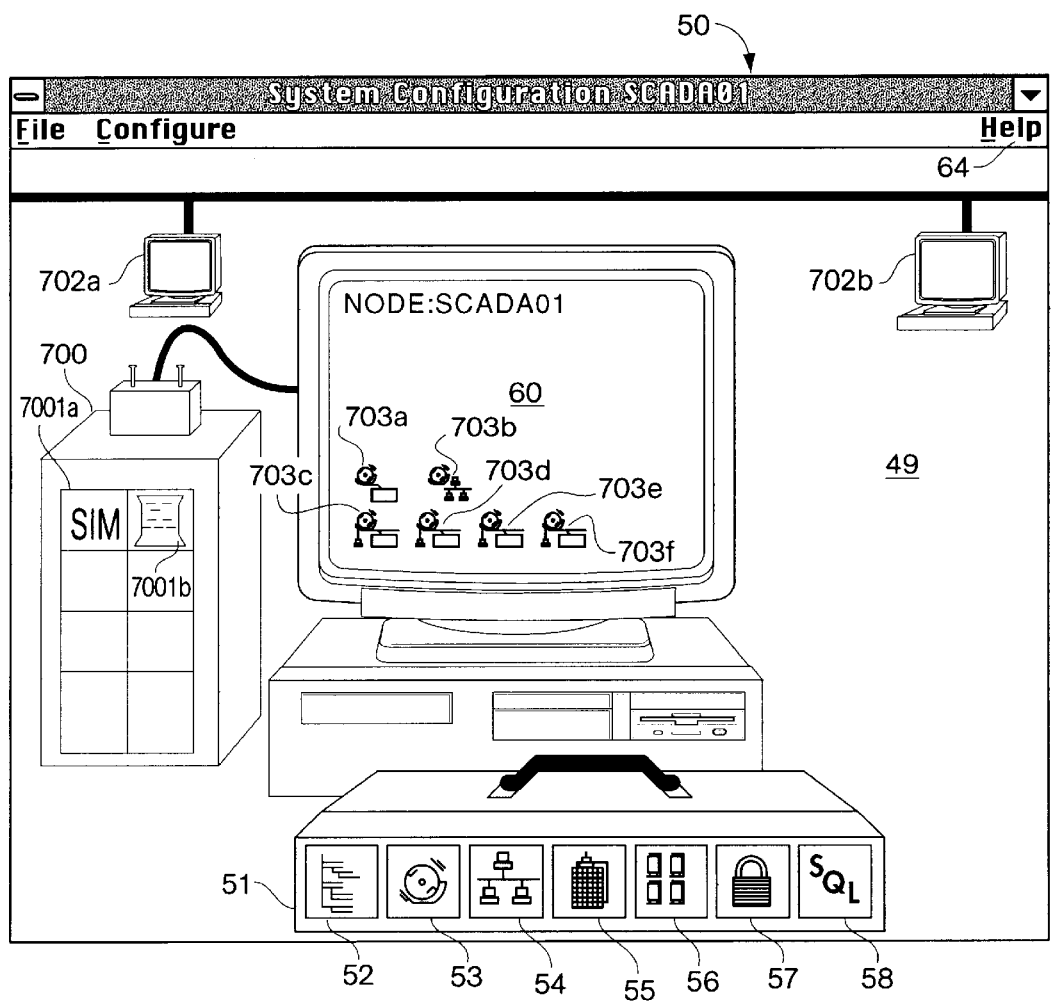

FIG. 19 represents the state of SCU window 50 after some setup and configuration has occurred. Note that there is a network connection, represented by the drawing 702 of the network and the two nodes 702a–702b. There are 6 alarms represented by the small icons 703a–703f, and there is a SCADA connection, represented by the drawing 700. There are two drivers configured for this SCADA node, as represented by the iconic regions 7001a–7001b of picture 700.

Each icon 703a–703f, 7001a–7001b corresponds to an active region of screen 49, as do the pictures of nodes 702a–702b on the network drawing. This is in addition to icons 52–58 in toolbox 51.

Small icons 7001a–7001b correspond to drivers and there is an entry for each of them in SCU Driver Information field 201 of SCU Data structure 125 (FIGS. 2a, 2b).

Referring to FIG. 2b, the number of configured drivers field 269 is set to two, and the first two of the individual driver fields 270 are used. Small icons 7001a–7001b can be used as shortcuts to the configuration routines for each of the drivers they represent. If the user selects one of icons 7001a–7001b, function 267 for that region (FIG. 2g) is called. Data 268 for function 267 is found in individual driver information field 270 for the driver represented by that icon.

Similarly, each small icon 703a–703f corresponds to an alarm and provides a shortcut to configuring that alarm. There is an entry for each of the six alarms in SCU Alarm Information field 204 of SCU data structure 125. Number of configured alarms 224 (FIG. 2d) is set to six, and six Individual Alarm Information fields 2041 are used. Active Region List (FIG. 2g) contains an individual active region 2120 for each of the small icons 703a–703f.

Another view of this system is that it adds and modifies values in a data structure corresponding to the configuration of a system. For each aspect or sub-structure of the data structure that is added, the system also provides the user with a representation (picture or icon) of the physical or actual object corresponding to that aspect. For example, in the description above, if the user adds a driver then a picture of a driver (corresponding to the added driver) is added to the display. The picture performs two functions. Firstly, it provides the user with a summary of the current state of the system (represented by that data structure). Secondly, the pictures become active regions of the display, responsive to selection and manipulation by the user using a cursor (and a mouse or keyboard). Since there is a function and data corresponding to each active region, the user can use them as shortcuts to aspects of the data structure. Thus, for example, a user can modify a particular alarm simply by selecting the icon corresponding to that alarm. There is no need to use the menus to get to the information and dialogue box for that alarm. If the user wishes to delete that alarm then this can be done by deleting the icon, without actually using the dialogue box.

Software that embodies the invention described and claimed in this application, may be implemented on any computer (such as an Intel DOS-based computer, a Digital Equipment Corporation VAX-based computer, etc.) that operates using any suitable operating system which includes a multitasking operating system, e.g., Windows 3.1. In addition, any suitable ANSI-standard C-compiler, object linker, and library manager can be used.

Other embodiments are within the following claims.

A portion of the disclosure of this patent document contains material which is subject to copyright protection. The copyright owner has no objection to the facsimile reproduction by anyone of the patent document or patent disclosure, as it appears in the Patent and Trademark Office file or records, but otherwise reserves all copyright rights whatsoever.

What is claimed is:

1. A method for enabling a user to configure a computer system that includes at least one computer that can be configured with data processing features and for enabling the user to view graphical representations of the data processing features of the configured computer on a display, comprising the steps of:

displaying, in a first area of the display, a graphical representation of the computer to be configured;

displaying, in a second area of said display, at least one first graphical object, each graphical object representing a different one of said data processing features and enabling the user to select said at least one first graphical object using an input device to configure the computer with the data processing feature represented by the selected one first graphical object;

prompting the user to enter information for configuring an instance of the data processing feature represented by said one first graphical object selected by the user, responding to the user entering said information by displaying, for each first graphical object selected, a second graphical object, like the first graphical object, within said first area of said display, indicating that said computer has been configured with said instance of said data processing feature, and enabling said computer system to thereafter use said instance of said data processing feature to process data in accordance with said information.

2. The method of claim 1 wherein the step of responding includes displaying each second graphical object within the graphical representation of the computer.

3. The method of claim 1 wherein said prompting step includes displaying a field that is associated with said data processing feature represented by said first graphical object selected by the user, said field including at least one record for said information, enabling said user to enter said information in said record using said input device.

4. The method of claim 1 further comprising the steps of enabling the user to select said second graphical object using said input device, responding to the selection of said second graphical object by displaying a field that contains said information that was previously entered for said instance of said data processing feature represented by said second graphical object, enabling the user to change said information in said field using said input device to modify said instance of said data processing feature, and enabling said computer system to thereafter use said instance of said data processing feature to process data in accordance with said changed information.

5. The method of claim 1 further comprising the step of responding to a subsequent selection of said first graphical object by prompting the user to enter information for configuring a second instance of said data processing feature, represented by said first graphical object selected by the user, responding to the user entering said information for said second instance of said data processing feature by displaying another second graphical object in said first area indicating that said computer has been configured with said second instance of said data processing feature, and enabling said computer system to thereafter use said second instance of said data processing feature to process data in accordance with said information for said second instance of said data processing feature.

6. The method of claim 1 wherein said instance of said data processing feature provides for at least one data path for storing data files established during operation of said computer system, said information identifying storage locations for said files.

7. The method of claim 1 wherein said instance of said data processing feature enables said computer to communicate with at least one other computer in said computer system over a network, said information including an identification of said other computer.

8. The method of claim 1 wherein said instance of said data processing feature processes at least one alarm in response to data processed during operation of said computer system, said information defining conditions for which said alarm will be generated.

9. The apparatus of claim 1 wherein said instance of said data processing feature enables said computer to exchange data signals with a device external to said computer system, said information specifying operating conditions of said device.

10. The method of claim 1 wherein said instance of said data processing feature includes a data processing task that is defined by said information.

11. A method for enabling a user to configure a computer system that includes a plurality of computers, each of which computer can be configured with data processing features and for enabling a user to view graphical representations of data processing features for each configured computer on a display, comprising the steps of:

displaying, in a first area of the display, a graphical representation of each of the configurable plurality of computers, enabling the selection of one of the computers for configuration;

displaying, in a second area of the display, a graphical representation of a selected one of the configurable computers;

displaying, in a third area of said display, a plurality of first graphical objects, each of which represents one of said data processing features;

enabling the user to select any of said first graphical objects using an input device for configuring the selected computer with data processing features represented by the selected first graphical objects, prompting the user to enter information for configuring an instance of each of the data processing features represented by said first graphical objects selected by the user, responding to the user entering said information for said instances of said data processing features by displaying one second graphical object for each selected first graphical object within the second area of said display indicating that said selected computer has been configured with said instances of said data processing features, and enabling said computer system to thereafter use said instances of said data processing features to process data in accordance with said information for said instances of said data processing features.

12. Apparatus for enabling a user to configure a computer system that includes at least one computer that can be configured with data processing features and for enabling the user to view graphical representations of the computer configured with data processing features on a display comprising:

means for displaying, in a first area of the display, a graphical representation of each configurable computer, one of which can be selected by a user for configuring;

means for displaying, in a second area of the display, a graphical representation of a computer selected for configuration;

means for displaying, in a third area of said display, a plurality of first graphical objects, each of which represents one of said data processing features, means for enabling the user to select any of the first graphical objects using an input device of said computer, means for prompting the user to enter information for configuring an instance of a data processing feature represented by said first graphical object selected by the user, means for responding to the user entering said information by displaying a second graphical object for each selected first graphical object in the second area of said display indicating that said selected computer has been configured with said instance of said data processing feature, and means for enabling said computer system to thereafter use said instance of said data processing feature to process data in accordance with said information.

13. The apparatus of claim 12 wherein said means for responding includes displaying each second graphical object within the graphical representation of the selected computer.

14. The apparatus of claim 12 wherein said means for prompting includes means for causing said display to display a field that is associated with said data processing feature represented by said first graphical object selected by the user, said field including at least one record for said information, means for enabling said user to enter said information in said record using said input device.

15. The apparatus of claim 12 wherein said means for enabling enables the user to make a second selection of any first graphical object, said means for prompting responds to said second selection by prompting the user to enter information for configuring a second instance of said data processing feature represented by said first graphical object, said means for responding responds to the entry of said information for said second instance of said data processing feature by displaying another second graphical object in the second area of said display indicating that said selected computer has been configured with said second instance of said data processing feature, and said means for enabling enables said computer system to thereafter use said second instance of said data processing feature to process data in accordance with said information for said second instance of said data processing feature.

16. The apparatus of claim 12 wherein said instance of said data processing feature provides for at least one data path for storing data files established during operation of said computer system, said information identifying storage locations for said files.

17. The apparatus of claim 12 wherein said instance of said data processing feature enables said computer to communicate with at least one other computer in said computer system over a network, said information including an identification of said other computer.

18. The apparatus of claim 12 wherein said instance of said data processing feature processes at least one alarm in response to data processed during operation of said computer system, said information defining conditions for which said alarm will be generated.

19. The method of claim 12 wherein said instance of said data processing feature enables said computer to exchange data signals with a device external to said computer system, said information specifying operating conditions of said device.

20. The apparatus of claim 12 wherein said instance of said data processing feature includes a data processing task that is defined by said information.

21. A computer readable medium encoded with a computer program for use on a general purpose computer comprising:

a mechanism for displaying, in a first area of a computer display, a selected configurable computer;

a mechanism for displaying, in a second area of the display, a plurality of iconic symbols representing a plurality of features with which the selected computer can be configured;

a mechanism for allowing a user of said general purpose computer to select a single iconic symbol to configure the selected computer with a feature represented by the selected single iconic symbol;

a mechanism for allowing the user to enter configuration information about said feature represented by the selected single iconic symbol;

a mechanism for displaying a copy of said selected single iconic symbol in the first area of said display, in response to said user entering said configuration information about said feature indicating that the selected computer has been configured with said feature and configuration information.

22. A computer display system for enabling a user to graphically configure computers with features, wherein the computers are networked to monitor and control equipment in an industrial process control environment, comprising:

a mechanism for displaying, in a first area of a display, a computer selected for configuration;

a mechanism for displaying, in a second area of the display, iconic representations of the features with which the selected computer can be configured;

a mechanism to configure the selected computer with any feature by allowing a user to select an iconic representation of any of the features, and enter configuration information about that feature;

a mechanism to display a second iconic representation of each selected feature within the first area of the display.

23. The apparatus of claim 22 wherein the second iconic representation of each feature is substantially identical to the first iconic representation of that feature.

* * * * *